(12) United States Patent
Hayles

(10) Patent No.: US 8,782,596 B2
(45) Date of Patent: Jul. 15, 2014

(54) AUTOMATICALLY GENERATING A GRAPHICAL DATA FLOW PROGRAM BASED ON A CIRCUIT DIAGRAM

(75) Inventor: Timothy J. Hayles, Austin, TX (US)

(73) Assignee: National Instruments Corporation, Austin, TX (US)

( * ) Notice: Subject to any disclaimer, the term of this patent is extended or adjusted under 35 U.S.C. 154(b) by 139 days.

(21) Appl. No.: 13/163,602

(22) Filed: Jun. 17, 2011

(65) Prior Publication Data

US 2011/0252345 A1    Oct. 13, 2011

Related U.S. Application Data

(63) Continuation of application No. 11/465,072, filed on Aug. 16, 2006, now abandoned.

(60) Provisional application No. 60/708,474, filed on Aug. 16, 2005.

(51) Int. Cl.
*G06F 9/44*            (2006.01)

(52) U.S. Cl.
CPC ........................................ *G06F 8/35* (2013.01)
USPC ........................................... 717/105; 717/113

(58) Field of Classification Search
None
See application file for complete search history.

(56) References Cited

U.S. PATENT DOCUMENTS

| | | | |
|---|---|---|---|
| 5,294,290 A * | 3/1994 | Reeb | ................................. 216/6 |
| 5,481,741 A | 1/1996 | McKaskle et al. | |
| 5,617,327 A | 4/1997 | Duncan | |
| 5,764,546 A | 6/1998 | Bryant et al. | |
| 5,875,391 A | 2/1999 | Riley et al. | |
| 5,987,246 A | 11/1999 | Thomsen et al. | |
| 6,069,489 A | 5/2000 | Iwanczuk et al. | |
| 6,094,488 A | 7/2000 | Bianchessi et al. | |
| 6,389,379 B1 | 5/2002 | Lin et al. | |
| 6,389,587 B1 | 5/2002 | Lewis | |
| 6,711,598 B1 | 3/2004 | Pare, Jr. et al. | |
| 6,732,064 B1 | 5/2004 | Kadtke et al. | |
| 7,043,693 B2 | 5/2006 | Wenzel et al. | |
| 7,062,718 B2 | 6/2006 | Kodosky et al. | |

(Continued)

OTHER PUBLICATIONS

Wan-Teh Chang, Soonhoi Ha, and Edward A. Lee, "Heterogeneous Simulation—Mixing Discrete-Event Models with Dataflow," Journal of VLSI Signal Processing, 1997, pp. 127-144.

Joseph Buck, Soonhoi Ha, Edward A. Lee and David G. Messerschmitt, "Ptolemy: A Framework for Simulating and Prototyping Heterogeneous Systems," International Journal in Computer Simulation, 1994; pp. 155-182.

(Continued)

*Primary Examiner* — Jason Mitchell
(74) *Attorney, Agent, or Firm* — Meyertons Hood Kivlin Kowert & Goetzel, P.C.; Jeffrey C. Hood; Joel L. Stevens

(57) ABSTRACT

A method and system configured to: (a) display a first diagram including a first icon in response to input selecting the first icon; (b) associate the first icon with a first hardware device in response to input selecting the first hardware device from a set of hardware devices; (c) associate the first icon with a set of physical channels of the first hardware device in response to user input selecting the physical channels; and (d) perform the following operations one or more times: receive user input selecting a resource from a set of available resources including resources on the first hardware device; update the first diagram to include a graphical representation of the selected resource; receive user input to the first diagram specifying configuration information for the selected resource; and store the configuration information; (e) display a dataflow node indicating a transfer operation to be performed.

24 Claims, 20 Drawing Sheets

(56) References Cited

U.S. PATENT DOCUMENTS

| | | | |
|---|---|---|---|
| 7,076,740 | B2 | 7/2006 | Santori et al. |
| 7,523,023 | B1 | 4/2009 | Koh et al. |
| 2002/0089538 | A1 | 7/2002 | Wenzel et al. |
| 2003/0005180 | A1* | 1/2003 | Schmit et al. ............. 709/328 |
| 2003/0035006 | A1 | 2/2003 | Kodosky et al. |
| 2003/0037316 | A1* | 2/2003 | Kodosky et al. ............ 717/127 |
| 2003/0046663 | A1 | 3/2003 | Rogers et al. |
| 2003/0110464 | A1 | 6/2003 | Davidson et al. |
| 2004/0083081 | A1 | 4/2004 | Reghetti et al. |
| 2004/0230944 | A1 | 11/2004 | Murphy et al. |
| 2005/0257195 | A1 | 11/2005 | Morrow et al. |
| 2006/0064669 | A1 | 3/2006 | Ogilvie et al. |
| 2006/0064670 | A1 | 3/2006 | Linebarger et al. |
| 2006/0117302 | A1 | 6/2006 | Mercer et al. |
| 2006/0195050 | A1 | 8/2006 | Alwan et al. |
| 2007/0044071 | A1 | 2/2007 | Hayles |
| 2007/0157162 | A1 | 7/2007 | Ciolfi |
| 2010/0125820 | A1 | 5/2010 | Ispir |

OTHER PUBLICATIONS

Hugo A. Andrade and Scott Kovner, "Software Synthesis from Dataflow Models for G and LabVIEW," Proceedings in IEEE Asilomar Conference on Signals, Systems, and Computers; Nov. 1998, pp. 1705-1709.

Loic Besnard, Patricia Bournai, Thierry Gautier, Nicolas Halbwachs, Simin Nadjm-Tehrani, and Annie Ressouche, "Design of a multi-formalism application and distribution in a data-flow context: an example," 12th International Symposium on Languages for International Programming, Jun. 1999; pp. 8-30.

Stephen Anthony Edwards, "The Specification and Execution of Heterogeneous Synchronous Reactive Systems," PhD Thesis, University of California, Berkeley, 1997, retrieved from the Internet: http://ptolemy.eecs.berkeley.edu/papers/97/sedwardsThesis/sedwardsThesis.pdf, 170 pages.

* cited by examiner

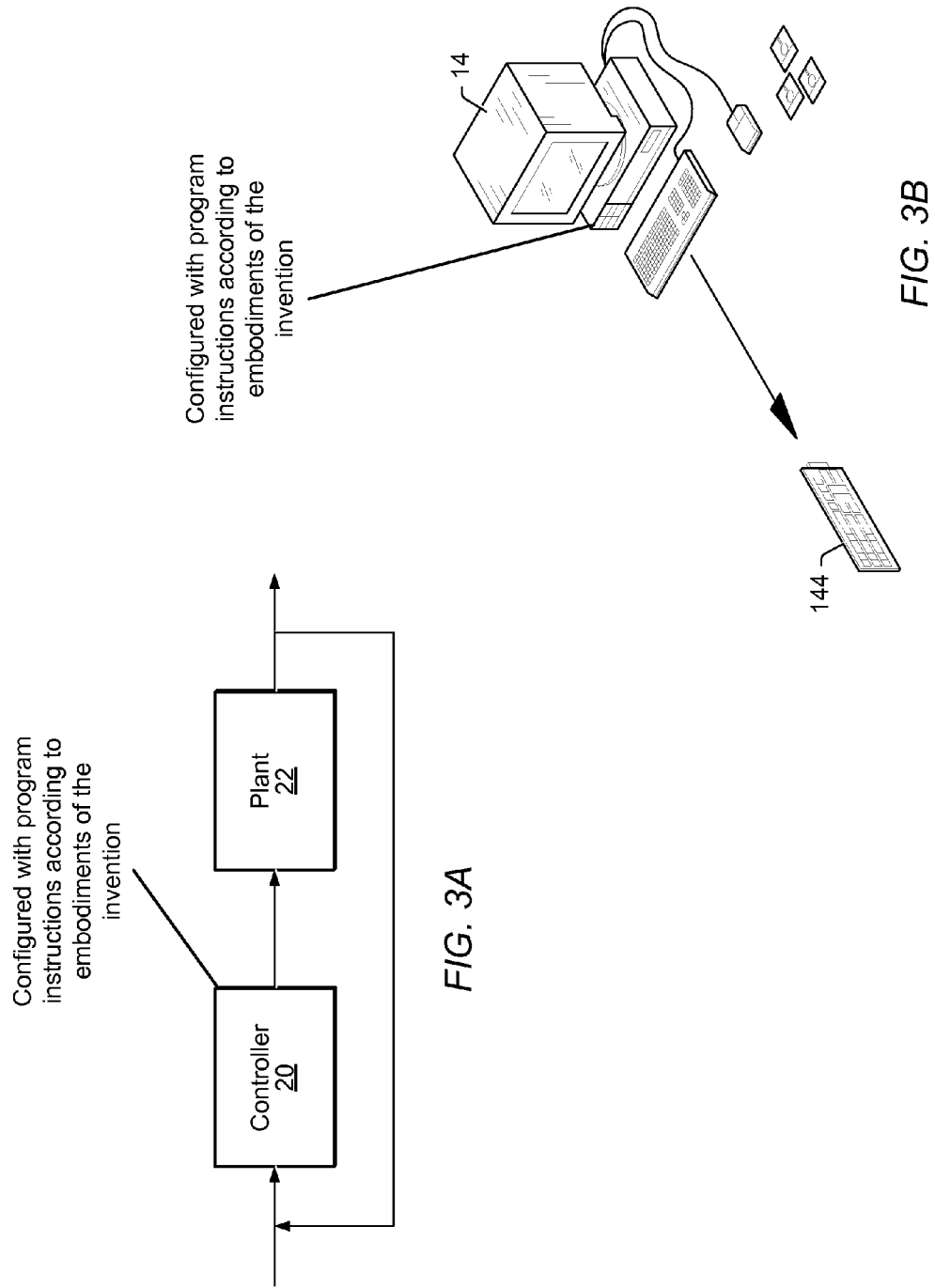

configure a first diagram on a display in response to user input, where the first diagram includes a plurality of graphical elements that represent a plurality of circuit resources, where the circuit resources include one or more circuit resources available on a hardware device, where the first diagram also includes one or more connections between the plurality of graphical elements, where the one or more connections represent flow of one or more signals between the plurality of circuit resources, where the first diagram visually indicates a configuration of the plurality of circuit resources
740 automatically generate a graphical data flow program based at least on the first diagram, where the graphical data flow program includes a plurality of nodes and connections between the nodes, where the connections between the nodes represent data flow dependencies between the nodes
745

FIG. 7D

AUTOMATICALLY GENERATING A GRAPHICAL DATA FLOW PROGRAM BASED ON A CIRCUIT DIAGRAM

PRIORITY DATA

This application is a continuation of U.S. patent application Ser. No. 11/465,072, filed on Aug. 16, 2006 now abandoned, entitled "Automatically Generating a Graphical Data Flow Program Based on a Circuit Diagram", invented by Timothy J. Hayles, which claims priority to U.S. Provisional Application No. 60/708,474, filed on Aug. 16, 2005, entitled "Graphical Programming Methods for Generation, Control and Routing of Digital Pulses", invented by Timothy J. Hayles, both of which are hereby incorporated by reference in its entirety.

FIELD OF THE INVENTION

The present invention relates to the field of graphical programming, and more particularly to a system and method for enabling a graphical program development environment to support methods for specifying hardware configuration information for hardware devices.

DESCRIPTION OF THE RELATED ART

Traditionally, high level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

Some graphical program development environments that have been utilized for the creation of graphical programs that conform to data flow semantics, i.e., data flow graphical programs. A data flow graphical program comprises a diagram that includes a plurality nodes connected by connections or "wires", where the connections indicate that data produced by one node is used by another node.

One example of data flow semantics is that the connections between the nodes indicate that data produced by one node is used by another node. Another example of data flow semantics is that the nodes of the data flow diagram operate such that the order of operations is implied by or controlled by data interdependencies among the nodes.

Another example of data flow semantics is that the nodes of the data flow diagram obey the following semantic principles:
  the order of operations is not completely specified by the user;
  the order of operations is implied by data interdependencies;

a node in the data flow diagram may execute after all necessary inputs have become available.

The process of configuring hardware devices using data flow graphical programs may not be very intuitive or efficient. Thus, it would be desirable to provide improved systems and methodologies for specifying configuration information (especially timing configuration information) for hardware devices in the context of a graphical program development environment.

SUMMARY

In one set of embodiments, a processor (e.g., the processor of a computer system) may be configured to: display a first diagram including a first icon in response to user input selecting a first node; associate the first icon with a first hardware device in response to user input selecting the first hardware device from a set of hardware devices; associate the first icon with a set of one or more physical channels of the first hardware device in response to user input selecting the one or more physical channels;
perform the following operations one or more times:
    receive user input selecting a resource from a set of available resources including resources on the first hardware device;
    update the first diagram to include a graphical representation of the selected resource;
    receive user input to the first diagram specifying configuration information for the selected resource;
    update the first diagram so that any displayed graphical representations of selected resources are consistent with the specified configuration information;
    store the configuration information; and
display a dataflow node in response to user input selecting the dataflow node.

The physical channels may include external pins of the hardware device (e.g., analog input pins, analog output pins, digital input pins, and digital output pins) and the names of counters.

The dataflow node may indicate that a transfer operation is to be performed. However, the dataflow node need not indicate a transfer operation. In some circumstances, the dataflow node may simply invoke execution of a task that happens on the hardware device without involving the transfer of data to/from the host computer. For example, the hardware device may be set up to generate a clock signal and export the generated signal to an external pin of the hardware device, thus making the generated signal available to some external system.

Furthermore, the processor may store information indicating that the transfer operation is to be between a host computer and the first hardware device in response to user input connecting the first diagram and the dataflow node.

The processor may generate dataflow program code in response to each iteration of said receiving user input specifying configuration information, where the dataflow program code is configured to implement the configuration choices represented by the configuration information.

The processor may: execute the dataflow program code in order to configure the first hardware device for the transfer operation, and invoke the transfer operation.

Furthermore, the processor may: discontinue display of the first diagram; and display dataflow program code in place of the first diagram.

The dataflow program code may be configured to implement the configuration choices represented by the first diagram and the user-specified configuration information.

In some embodiments, the processor may send the configuration information to the device driver of the first hardware device in response to each iteration of said receiving user input specifying the configuration information. Thus, configuration state information for the hardware device accumulates in the device driver. The accumulated configuration state information may be transferred to the hardware device when the whole graphical program (including the first diagram and the data flow portion) is executed.

In an alternative embodiment, the processor may send the configuration information to the first hardware device in response to each iteration of said receiving of user input specifying the configuration information.

Each update of the first diagram may include displaying a plurality of icons (including the first icon) and a plurality of connections between the icons.

The plurality of icons represent the selected resources, where the plurality of connections represent signals that flow between the selected resources. As used herein, the term "icon" is used in a sense that does not require an icon to be individually movable (i.e., capable of being individually moved to different locations on the screen) by the user. The present invention contemplates embodiments where the icons are movable and other embodiments were they are not (or at least not movable relative to other icons in the first diagram).

Each update of the first diagram may include one or more numeric controls, where said receiving user input to the first diagram specifying configuration information includes: receiving at least a portion of the configuration information from said one or more numeric controls.

Each update of the first diagram may include one or more numeric indicators, the method further comprising: displaying one or more resource configuration values that are currently in effect in the first hardware device on the one or more numeric indicators.

In response to user input attempting to change a resource configuration value (e.g., via a control in the first diagram), the processor may determine validity of the user-supplied value (e.g., by querying the device driver of the hardware device). In response to determining that the user-supplied value is valid, the processor may: direct the device driver to incorporate the user-supplied value into its set of stored configuration state information for the hardware device, or alternatively, update the hardware device with the user-supplied value; and update the first diagram to indicate the user-supplied value.

In response to determining that the user-supplied value is invalid, the processor may override the user-supplied value and display a previous resource configuration value in the first diagram in an indicator of the first diagram.

The plurality of icons may include: one or more timing icons that represent one or more respective timing resources of the hardware device; and one or more data path icons that represent one or more data path resources of the hardware device.

The plurality of icons may include a first set of one or more terminal icons, where each terminal icon of the first set represents either an input connector terminal or an output connector terminal of the first hardware device.

The plurality of icons include a second set of one or more terminal icons, where each terminal icon of the second set represents an output of a circuit resource of the first hardware device.

The data path icons may include a FIFO icon representing a FIFO on the first hardware device.

The processor may also associate each physical channel with a measurement type and zero or more additional parameters further specifying that measurement type.

The transfer operation may be a read operation or a write operation or a combination of read and write operations.

The set of available resources may include the memory of a host computer.

In another set of embodiments, the processor may be configured to:
  configure a diagram on a display, where the diagram comprises a plurality of icons that correspond to circuit resources of a hardware device, where the diagram comprises a plurality of connections between the icons, where the connections represent flow of signals between the circuit resources represented by the plurality of icons; and
  configure the hardware device based on the diagram to produce a configured hardware device, where the configured hardware device is operable to perform a task involving one or more of data input and data output.

The diagram may graphically illustrate a configuration of the hardware device.

The operation of configuring the diagram may include displaying at least one icon that corresponds to a circuit resource of the hardware device in response to user input.

The operation of configuring the diagram may include specifying parameters of one or more of the circuit resources.

The operation of configuring the diagram may include receiving user input specifying one or more of:
  the hardware device;
  a type of channels;
  a number of channels.

The operation of configuring the diagram may include: receiving user input specifying at least one specific channel of a plurality of possible channels.

The operation of configuring the diagram may include: displaying a first icon which corresponds to an analog-to-digital converter; and specifying a sampling rate of the analog-to-digital converter.

In yet another set of embodiments, the processor may be configured to create a graphical program by:
  configuring a first diagram portion on a display, where the first diagram portion comprises a plurality of icons that correspond to hardware components of a hardware device, where the first diagram portion also comprises first connections between the plurality of icons, where the first connections represent flow of signals between the hardware components represented by the plurality of icons, where the first diagram portion visually indicates a configuration of the hardware device;
  configuring a second diagram portion on the display, where the second diagram portion comprises a data flow diagram portion, where the data flow diagram portion comprises a plurality of nodes and second connections between the nodes, where the second connections represent data flow dependencies between the plurality of nodes; and
  connecting the first diagram portion and the second diagram portion together.

In yet another set of embodiments, a processor may be configured to create a data flow program by:
  configuring a first diagram on a display, where the first diagram comprises a plurality of icons that correspond to hardware components of a hardware device, where the first diagram also comprises first connections between the plurality of icons, where the first connections represent flow of signals between the hardware components represented by the plurality of icons, where the first diagram visually indicates a configuration of the hardware device; and
  automatically generating a data flow program based on the first diagram, where the data flow program comprises a plurality of nodes and second connections between the nodes, where the second connections represent data flow between the plurality of nodes.

In one set of embodiments, a method for creating a graphical program may involve:
  configuring a first diagram portion on a display, where the first diagram portion includes a plurality of graphical elements that correspond to hardware components of a hardware device, where the first diagram portion also includes one or more connections between the plurality of graphical elements, where the one or more connections represent flow of one or more signals between the hardware components corresponding to the plurality of graphical elements, where the first diagram portion visually indicates a configuration of the hardware device;
  configuring a second diagram portion on the display, where the second diagram portion includes a data flow diagram portion, where the data flow diagram portion includes one or more nodes; and
  connecting the first diagram portion and the second diagram portion together to create the graphical program, where the graphical program is executable.

The one or more nodes may include a plurality of nodes. The second diagram portion may include one or more connections between the plurality of nodes. The one or more connections between the plurality of nodes represent data flow ordering dependencies between the plurality of nodes.

The process of configuring the first diagram portion may include receiving user input to the first diagram portion. The user input may specify a value of a parameter of the hardware device. The specified value may be checked (e.g., by querying the device driver of the hardware device) to determine if it is valid. The specified value may be displayed through an indicator in the first diagram portion in response to determining that the specified value is valid.

The user input may also specify a circuit resource. The specified circuit resource may be checked (e.g., by querying the device driver) to determine if it is realizable on the hardware device. The first diagram portion may be updated to include one or more graphical elements corresponding to the specified circuit resource in response to determining that the specified circuit resource is realizable on the hardware device.

The process of configuring the first diagram portion may include updating the first diagram portion in response to user input selecting a circuit resource of the hardware device, where the updated first diagram portion includes one or more graphical elements that represent the selected circuit resource.

The process of configuring the first diagram portion may include receiving user input to the first diagram portion. The method may further involve configuring the hardware device (or the device driver of the hardware device) in response the user input to the first diagram portion.

In some embodiments, the method may also involve executing the graphical program to invoke performance of a data transfer task, where the data transfer task is specified by the graphical program.

The action of connecting the first diagram portion and the second diagram portion together may involve either: (a) connecting an output of the first diagram portion to an input of the second diagram portion; or (b) connecting an input of the first diagram portion to an output of the second diagram portion.

The graphical program may be stored in a memory medium (e.g., in the memory of a computer system, or on a mass storage device such as a hard disk).

A second graphical program may be automatically generated based on the first diagram portion, where the second graphical data flow program is executable to configure the hardware device with the configuration indicated by the first diagram portion.

The first diagram portion may also include one or more graphical elements corresponding to hardware resources on a host computer.

In some embodiments, the graphical program is operable to be implemented on a programmable hardware element. For example, the graphical program may be compiled into a form suitable for programming a programmable hardware element.

In some embodiments, the method may also involve: configuring the hardware device based on the first diagram portion to produce a configured hardware device, where the configured hardware device is operable to perform a task specified by the graphical program; and creating an executable program based on the second diagram portion, where the executable program is executable by a processor to analyze data generated by the hardware device in response to performance of the task.

In one set of embodiments, a method for creating a graphical program may involve assembling a graphical program on the display, where said assembling the graphical program includes:

displaying a plurality of graphical elements in response to user input, where each of the graphical elements represents a respective circuit entity;

displaying a plurality of graphical program nodes in response to user input, where the graphical program nodes are connected to specify data flow dependencies among the second plurality of graphical program nodes;

connecting at least one of the graphical elements and at least one of the graphical program nodes to create the graphical program.

The process of displaying the plurality of graphical elements may be performed by a single graphical program node.

The first diagram portion may be updated in response to user input selecting a value of a parameter of the hardware device, selecting a circuit resource, or deselecting a circuit resource, where said updating the first diagram is performed by the single graphical program node.

The graphical program may be stored in a memory medium (e.g., in the memory of a computer system, or on a storage device such as a hard disk).

In one set of embodiments, a method for creating a graphical data flow program may involve:

configuring a first diagram on a display, where the first diagram includes a plurality of graphical elements that correspond to a plurality of hardware components on a hardware device, where the first diagram also includes one or more connections between the plurality of graphical elements, where the one or more connections represent flow of one or more signals between the hardware components, where the first diagram visually indicates a configuration of the hardware device; and automatically generating a graphical data flow program based at least on the first diagram, where the graphical data flow program includes a plurality of nodes and connections between the nodes, where the connections between the nodes represent data flow dependencies between the nodes.

The graphical data flow program may be executed in order to configure the hardware device. The execution of the graphical data flow program configures the hardware device to implement the configuration indicated by the first diagram.

The graphical program may be stored in a memory medium (e.g., in the memory of a computer system, or on a mass storage device such as a hard disk).

The process of configuring the first diagram on the display may include updating the first diagram to add one or more additional graphical elements in response to user input to the first diagram selecting a circuit resource of the hardware device.

The process of configuring the first diagram on the display may include updating the first diagram to remove one or more of the graphical elements in response to user input to the first diagram deselecting a circuit resource of the hardware device.

The process of configuring the first diagram on the display may include updating the first diagram to replace one or more of the graphical elements with one or more additional graphical elements in response to a user selection.

The process of configuring a first diagram on a display may include receiving user input to the first diagram specifying a value of a parameter of the hardware device. The method may also involve: determining if the specified value is valid (e.g., by querying a device driver of the hardware device); and displaying the specified value in the first diagram in response to determining that the specified value is valid.

The process of configuring a first diagram on a display may include receiving user input to the first diagram specifying a circuit resource. The method may also involve: determining if the specified circuit resource is valid for the hardware device; and updating the first diagram to include one or more graphical elements corresponding to the specified circuit resource in response to determining that the specified circuit resource is valid.

The graphical data flow program is executable to configure the hardware device to implement an input and/or output task that is specified by the first diagram.

In another set of embodiments, a method for creating a graphical data flow program may involve:

configuring a first diagram on a display in response to user input, where the first diagram includes a plurality of graphical elements that represent a plurality of circuit resources, where the circuit resources include one or more circuit resources available on a hardware device, where the first diagram also includes one or more connections between the plurality of graphical elements, where the one or more connections represent flow of one or more signals between the plurality of circuit resources, where the first diagram visually indicates a configuration of the plurality of circuit resources; and automatically generating a graphical data flow program based at least on the first diagram, where the graphical data flow program includes a plurality of nodes and connections between the nodes, where the connections between the nodes represent data flow dependencies between the nodes.

The graphical data flow program may be executed in order to configure the hardware device.

The process of executing the graphical data flow program may include invoking a transfer of configuration information to the hardware device to configure the hardware device.

The graphical data flow program may be stored in a memory medium (e.g., in the memory of a computer system, or on a mass storage device such as a hard disk).

The process of configuring the first diagram on the display may include updating the first diagram to add one or more additional graphical elements in response to user input to the first diagram selecting an additional circuit resource of the hardware device.

The process of configuring the first diagram on the display may include updating the first diagram to remove one or more of the graphical elements in response to user input to the first diagram deselecting one of the circuit resources of the hardware device.

The process of configuring the first diagram on the display may include updating the first diagram to replace one or more of the graphical elements with one or more additional graphical elements in response to a user selection.

In some embodiments, the plurality of circuit resources may include one or more circuit resources available on a host computer.

In some embodiments, a computer-readable memory medium is configured to store program instructions. The program instructions are executable to implement the method X, where method X is any of the method embodiments described herein (or any combination of the method embodiments described herein).

A memory medium is a medium configured for the storage of information. Examples of memory media include various kinds of magnetic media (e.g., magnetic tape, magnetic disk, magnetic strips, and magnetic film); various kinds of optical media (e.g., CD-ROM); various kinds of semiconductor RAM and ROM; various media based on the storage of electrical charge and/or other physical quantities; etc.

In some embodiments, a computer system may be configured to include a processor and a memory medium. The memory medium may be configured to store program instructions. The processor may be configured to read and execute the program instructions. The program instructions may be executable to implement method X, where method X is any of the various method embodiments described herein. The computer system may be realized in any of various forms. For example, the computer system may be a personal computer (in any of its various forms), a computer on a card, a server computer, a client computer, etc.

BRIEF DESCRIPTION OF THE DRAWINGS

A better understanding of the present invention can be obtained when the following detailed description of the preferred embodiment is considered in conjunction with the following drawings.

FIG. 3A is a high-level block diagram of an exemplary system which may execute or utilize graphical programs.

FIG. 3B illustrates an exemplary system which may perform control and/or simulation functions utilizing graphical programs.

FIG. 7D illustrates another set of embodiments of a method for creating a graphical data flow program.

Figure 1A:
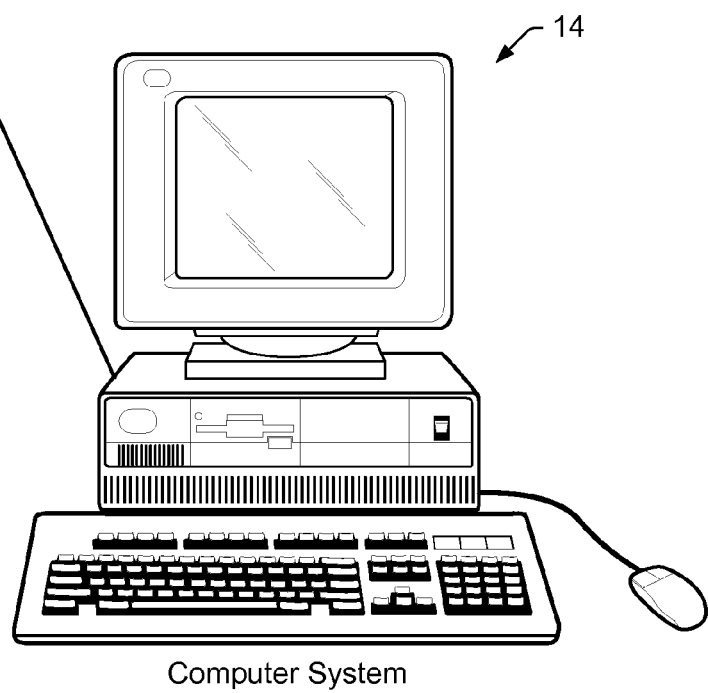
FIG. 1A illustrates a computer system operable to execute a graphical program according to one set of embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The following patents and patent applications are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

U.S. patent application Ser. No. 10/094,198, filed on Mar. 8, 2002, entitled "Self-Determining Behavior Node for Use in Creating a Graphical Program", invented by Kodosky, Gabbert and Rogers.

Terminology

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can store program instructions and/or data structures. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element programmed with a configuration information (e.g., a net list or a bit stream) to perform the function or implement the software object.

Program—the term "program" is intended to have the full breadth of its ordinary meaning. The term "program" includes 1) a software program which may be stored in a memory and is executable by a processor or 2) a program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Graphical Program—A program comprising a plurality of interconnected nodes or icons, where the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, where the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of a computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, a unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, where the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), where the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and/or output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. Exemplary input controls comprise dials, knobs, sliders, input text boxes, numeric input fields, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 14 operable to execute a graphical program development environment that allows a user to develop graphical programs. The development environment may operate according to any of the various embodiments described below.

The development environment also allows the user to deploy the graphical programs on target hardware devices, e.g., hardware devices including configurable resources such as data acquisitions devices.

As shown in FIG. 1A, the computer system 14 may include a display device operable to display the graphical program as the graphical program is created and/or executed. It is noted that the execution of the graphical program may result in the configuration of a hardware device (such as a data acquisition device) for input and/or output operations. Hardware devices may include various ASICs with configurable resources (especially, timing and triggering resources) for controlling data acquisition.

The display device may also be operable to display a graphical user interface or front panel of the graphical program during execution of the graphical program. The graphical user interface may be of any of various types, e.g., depending on the computing platform.

The computer system 14 may include a memory medium(s) on which one or more computer programs or software components may be stored. For example, the memory medium may store one or more graphical programs. Also, the memory medium may store a graphical program development environment application which may be used to create and/or execute graphical programs. The memory medium may also store operating system software, as well as other software for operation of the computer system. Various embodiments further include receiving or storing instructions and/or data implemented in accordance with the present description upon a carrier medium.

Figure 1B:
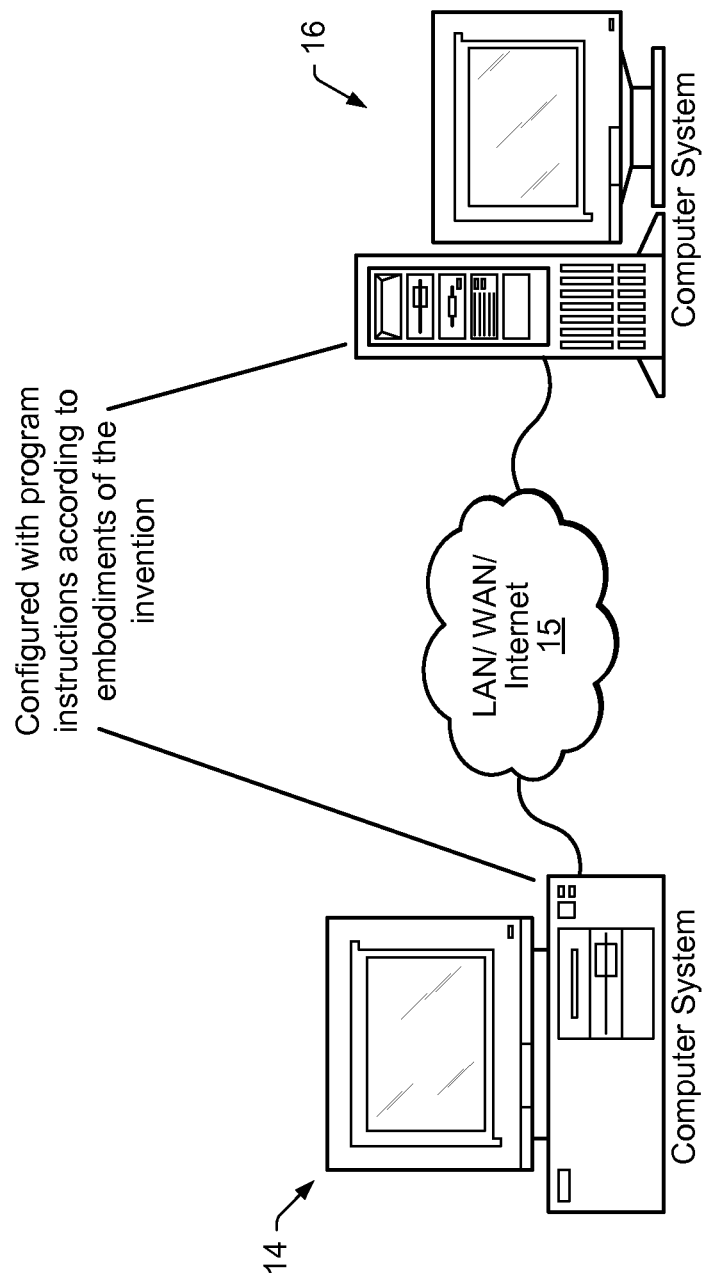
FIG. 1B illustrates a network system including two or more computer systems and operable to perform the method embodiments described herein.

FIG. 1B—Computer Network

FIG. 1B illustrates a system including a first computer system 14 that is coupled to a second computer system 16. The computer system 14 may be connected through a network 15 (or a computer bus) to the second computer system 16. The computer systems 14 and 16 may each be any of various types, as desired. The network 15 can also be any of various types, including a LAN (local area network), WAN (wide area network), the Internet, or an Intranet, among others. The computer systems 14 and 16 may execute a graphical program in a distributed fashion. For example, computer 14 may execute a first portion of the block diagram of a graphical program and computer system 16 may execute a second portion of the block diagram of the graphical program. As another example, computer system 14 may display the graphical user interface of a graphical program and computer system 16 may execute (or invoke execution of) the block diagram of the graphical program.

In one embodiment, the graphical user interface of the graphical program may be displayed on a display device of the computer system 14, and the block diagram may be deployed and executed on a target device connected to the computer system 14. The target device may include one or more of the following: a programmable hardware element; a processor and memory medium; and a set of one or more ASICs.

Exemplary Systems

Some embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
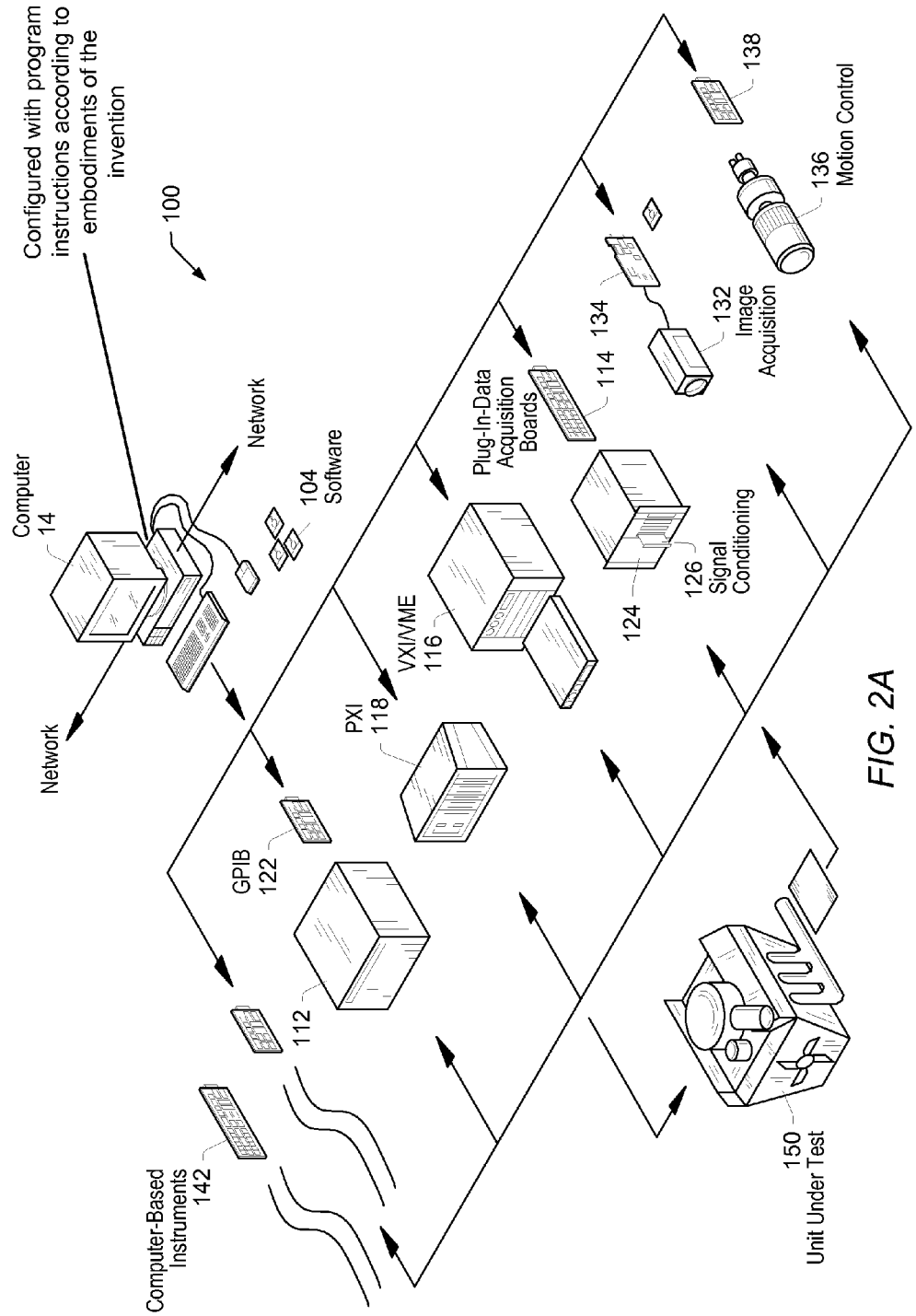
FIG. 2A illustrates an instrumentation control system according to one set of embodiments.
Figure 2B:
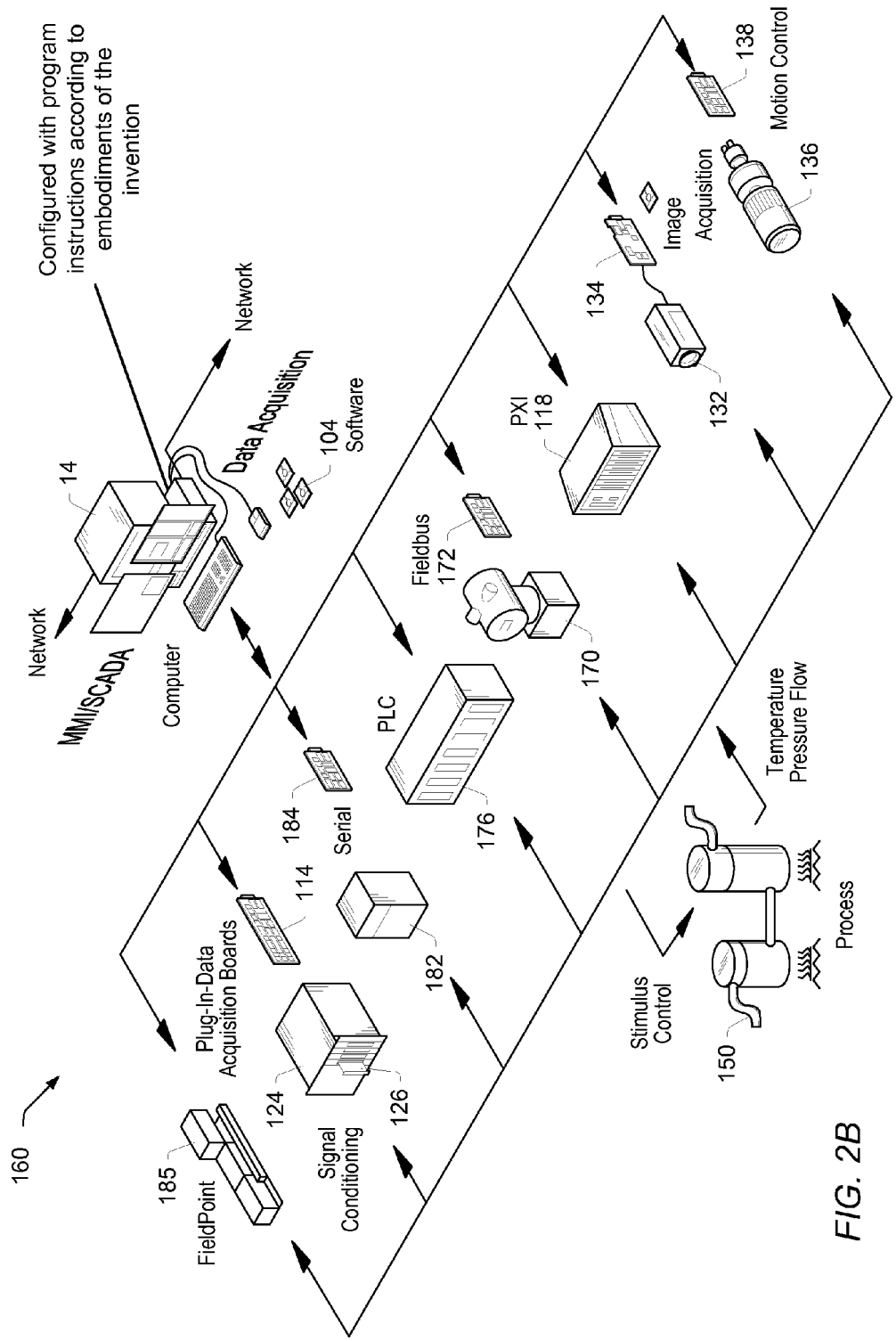
FIG. 2B illustrates an industrial automation system according to one set of embodiments.

The target device may take any of various forms and may be used in various applications as suggested in FIGS. 2A and 2B. In one embodiment, the target device may be a measurement device used in a test, measurement, or instrumentation application, e.g., to analyze, measure and/or control a unit under test (UUT) or process.

For example, the target device may be any of the following:
- a GPIB instrument 112 and associated GPIB interface card 122,
- a data acquisition board 114 and associated signal conditioning circuitry 124,
- a VXI instrument 116,
- a PXI instrument 118,
- a video device or camera 132 and associated image acquisition (or machine vision) card 134,
- a motion control device 136 and associated motion control interface card 138, and/or
- one or more computer based instrument cards 142, among other types of devices.

The computer system may couple to and operate with one or more of these instruments. The instruments may be coupled to a unit under test (UUT) or process 150, or may be coupled to receive field signals, e.g., signals generated by transducers. The system 100 may be used in a data acquisition and control application, in a test and measurement application, an image processing or machine vision application, a process control application, a man-machine interface application, a simulation application, or a hardware-in-the-loop validation application, among others.

The target device may also be an industrial automation device. The computer system 14 may operate with the target device 106 to perform an automation function, such as MMI (Man Machine Interface), SCADA (Supervisory Control and Data Acquisition), portable or distributed data acquisition, process control, data analysis, or other control, among others.

The target device 106 may be any of the following: a data acquisition board 114 and associated signal conditioning circuitry 124; a PXI instrument 118; a video device 132 and associated image acquisition card 134; a motion control device 136 and associated motion control interface card 138; a fieldbus device 170 and associated fieldbus interface card 172; a PLC (Programmable Logic Controller) 176; a serial instrument 182 and associated serial interface card 184; or a distributed data acquisition system, such as the Fieldpoint system available from National Instruments, among other types of devices.

FIG. 3A is a high level block diagram of an exemplary system which may execute or utilize graphical programs. FIG. 3A illustrates a general high-level block diagram of a generic control and/or simulation system which comprises a controller 20 and a plant 22. The controller 20 represents a control system/algorithm the user may be trying to develop. The plant 22 represents the system the user may be trying to control. For example, if the user is designing an engine control unit (ECU) for a car, the controller 20 is the ECU and the plant 22 is the car's engine (and possibly other components such as transmission, brakes, and so on.) As shown, a user may create a graphical program that specifies or implements the functionality of one or both of the controller 20 and the plant 22. For example, a control engineer may use a modeling and simulation tool to create a model (graphical program) of the plant 22 and/or to create the algorithm (graphical program) for the controller 20.

FIG. 3B illustrates an exemplary system which may perform control and/or simulation functions. As shown, the controller 20 may be implemented by a computer system 14 or other device 144 (e.g., including one or more of a programmable hardware element, an embedded processor, one or more ASICs) that executes or implements a graphical program. In a similar manner, the plant 22 may be implemented by the computer system and/or other device 144 that executes or implements a graphical program, or, may be implemented in or as a real physical system, e.g., a car engine.

In one embodiment, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 20, e.g., on the computer system 14 and/or other device 144

In one embodiment, one or more graphical programs may be created which are used in performing Hardware in the Loop (HIL) simulation. Hardware in the Loop (HIL) refers to the execution of the plant model 22 in real time to test operation of a real controller 20. For example, once the controller 20 has been designed, it may be expensive and complicated to actually test the controller 20 thoroughly in a real plant, e.g., a real car. Thus, the plant model (implemented by a graphical program) is executed in real time to make the controller 20 "believe" or operate as if it were connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming and/or configuration using a graphical program. Thus the user may create a graphical program on a computer and use (execute) the graphical program on that computer or deploy the graphical program to a target device (for execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
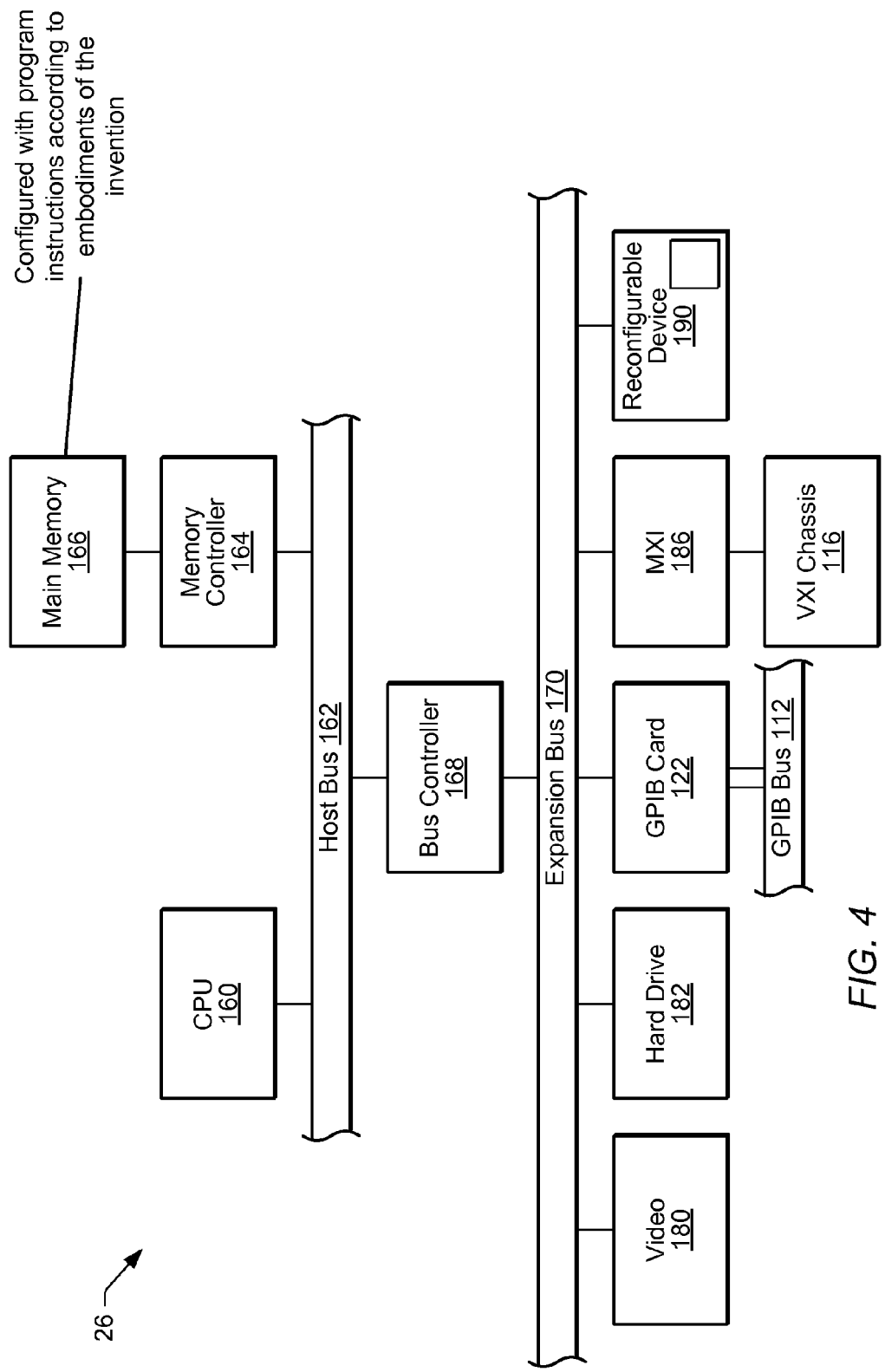
FIG. 4 illustrates one embodiment of a computer system, e.g., a computer system that may be used to realize one or more of the computer systems of FIGS. 1A-B, 2A-B and 3B.

FIG. 4—Computer System Block Diagram

FIG. 4 is a block diagram representing one embodiment of a computer system 26. The computer system may be representative of the computer system 14 and/or 16 illustrated in FIGS. 1A and 1B, or computer system 14 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory 166, is coupled to the host bus 162 by means of memory controller 164. The main memory 166 may store graphical program development environment software according to any of the various embodiments described herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types may be used. The expansion bus 170 includes slots for various devices such as described above. The computer system 14 also includes a video display subsystem 180 and hard drive 182 coupled to the expansion bus 170.

As shown, a device 190 may also be connected to the computer. The device 190 may include one or more of the following: a processor (e.g., a processor which may execute a real time operating system) and memory; a programmable hardware element; and a set of ASICS.

The computer system may be operable to deploy a graphical program to the device 190 for execution of the graphical program on the device 190.

Figure 5:
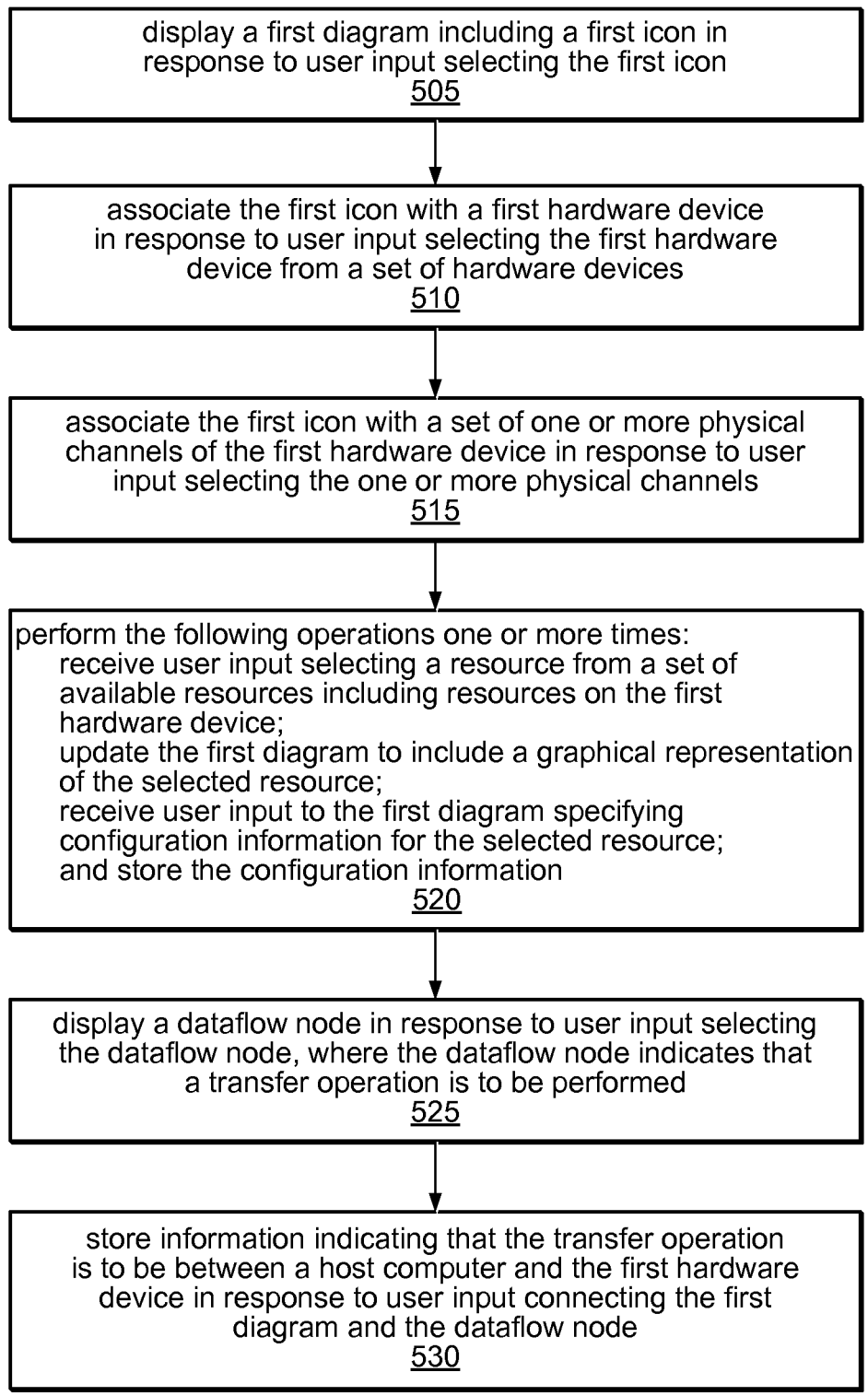
FIG. 5 is a flowchart diagram illustrating one embodiment of a method for specifying configuration information for a hardware device.
Figure 6:
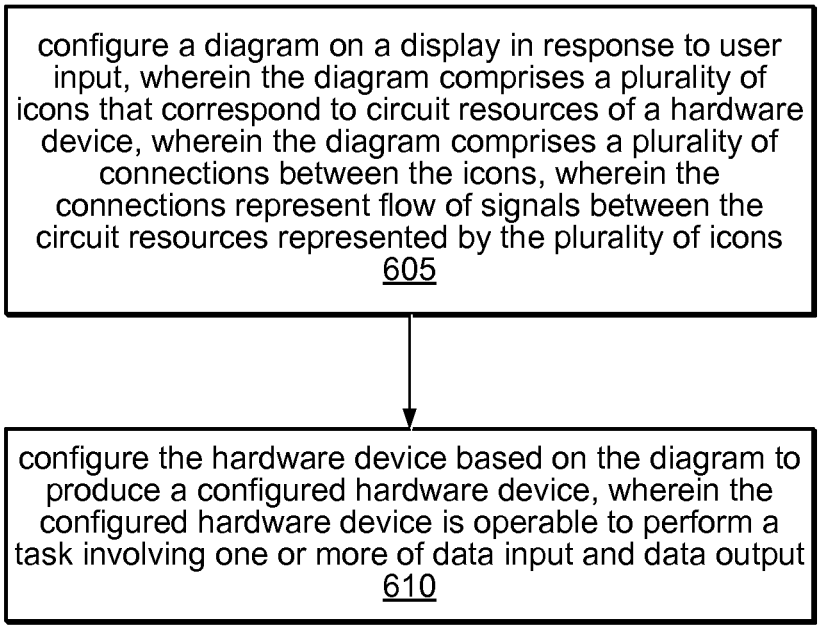
FIG. 6 is a flowchart diagram illustrating one embodiment of a method for configuring a hardware device.

FIGS. 5 and 6—Graphical Program Creation Method Embodiments

FIG. 5 is a flowchart diagram illustrating one embodiment of a method for specifying configuration information for a hardware device. The method may be implemented by a processor (e.g., the processor of a computer system such as computer system 26 or computer system 14). It is noted that actions described in the following flowcharts may occur concurrently or in different orders than that shown.

At 505, the processor may display a first diagram including a first icon in response to user input selecting the first icon.

At 510, the processor may associate the first icon with a first hardware device in response to user input selecting the first hardware device from a set of hardware devices.

At 515, the processor may associate the first icon with a set of one or more physical channels of the first hardware device in response to user input selecting the one or more physical channels.

At 520, the processor may perform the following operations one or more times:
 receive user input selecting a resource from a set of available resources including resources on the first hardware device;
 update the first diagram to include a graphical representation of the selected resource;
 receive user input to the first diagram specifying configuration information for the selected resource; and
 store the configuration information.

At 525, the processor may display a dataflow node in response to user input selecting the dataflow node, where the dataflow node indicates that a transfer operation is to be performed.

At 530, the processor may store information indicating that the transfer operation is to be between a host computer and the first hardware device in response to user input connecting the first diagram and the dataflow node.

The processor may generate dataflow program code in response to each iteration of said receiving of user input specifying configuration information, where the dataflow program code is configured to implement the configuration choices represented by the configuration information.

The processor may: execute the dataflow program code in order to configure the first hardware device for the transfer operation, and invoke the transfer operation.

Furthermore, the processor may: discontinue display of the first diagram; and display dataflow program code in place of the first diagram.

The dataflow program code may be configured to implement the configuration choices represented by the first diagram and the user-specified configuration information.

The processor may send the configuration information to the first hardware device in response to each iteration of said receiving of user input specifying the configuration information.

Each update of the first diagram may include: a plurality of icons including the first icon, and a plurality of connections between the icons.

The plurality of icons represent the selected resources, where the plurality of connections represent signals that flow between the selected resources.

Each update of the first diagram may include one or more numeric controls, where said receiving user input to the first diagram specifying configuration information includes receiving at least a portion of the configuration information from said one or more numeric controls.

Each update of the first diagram may include one or more numeric indicators, the method further comprising: displaying one or more resource configuration values that are currently in effect in the first hardware device on the one or more numeric indicators.

The plurality of icons may include: one or more timing icons that represent one or more respective timing resources of the hardware device; and one or more data path icons that represent one or more data path resources of the hardware device.

The plurality of icons may include a first set of one or more terminal icons, where each terminal icon of the first set represents either an input connector terminal or an output connector terminal of the first hardware device.

The plurality of icons may include a second set of one or more terminal icons, where each terminal icon of the second set represents an output of a circuit resource of the first hardware device.

The data path icons may include a FIFO icon representing a FIFO on the first hardware device.

The processor may also associate each physical channel with a measurement type and zero or more additional parameters further specifying that measurement type.

The transfer operation may be a read operation or a write operation or a combination of read and write operations.

The set of available resources may include the memory of a host computer.

FIG. 6 illustrates one embodiment of a method for configuring a hardware device. Again, the method may be implemented by a processor (e.g., the processor of a computer system such as computer system 26 or computer system 14).

At 605, the processor may configure a diagram on a display in response to user input, where the diagram comprises a plurality of icons that correspond to circuit resources of a hardware device, where the diagram comprises a plurality of connections between the icons, where the connections represent flow of signals between the circuit resources represented by the plurality of icons.

At 610, the processor may configure (e.g., automatically configure) the hardware device based on the diagram to produce a configured hardware device, where the configured hardware device is operable to perform a task involving one or more of data input and data output.

The diagram may graphically illustrate a configuration of the hardware device.

The operation of configuring the diagram may include displaying at least one icon that corresponds to a circuit resource of the hardware device in response to user input.

The operation of configuring the diagram may include specifying parameters of one or more of the circuit resources.

The operation of configuring the diagram may include receiving user input specifying one or more of: the hardware device; a type of channels; a number of channels.

The operation of configuring the diagram may include: receiving user input specifying at least one specific channel of a plurality of possible channels.

The operation of configuring the diagram may include: displaying a first icon which corresponds to an analog-to-digital converter; and specifying a sampling rate of the analog-to-digital converter.

Figure 7A:
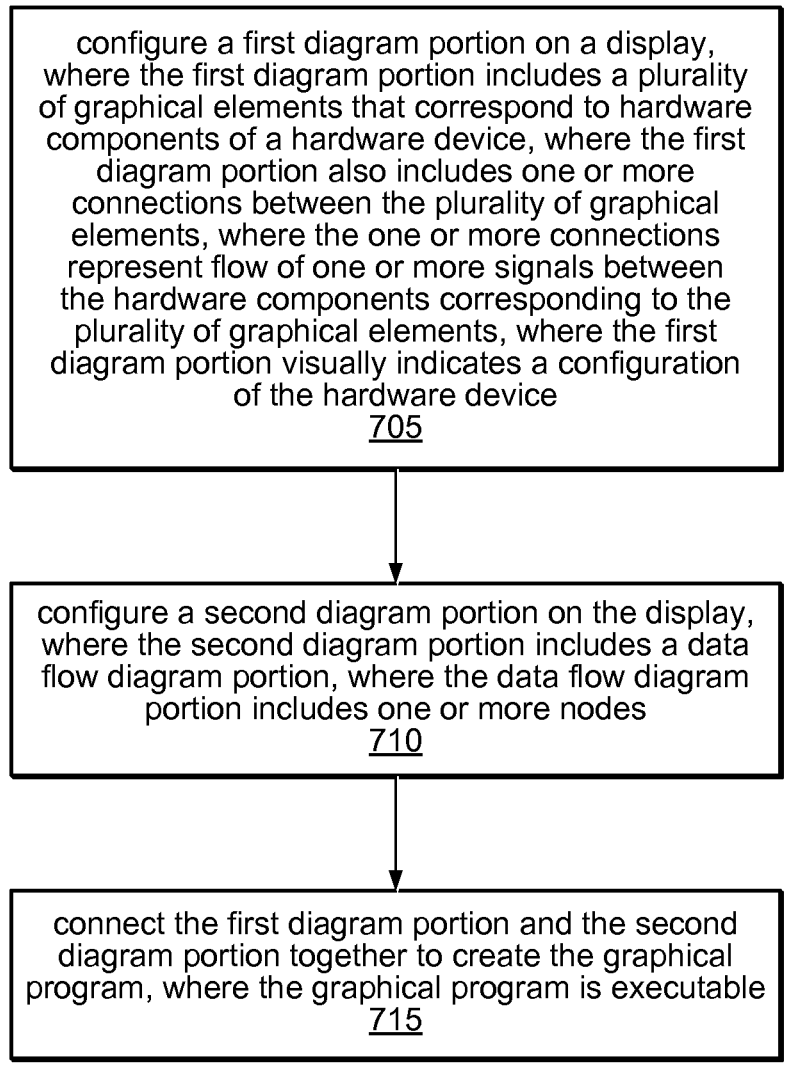
FIG. 7A illustrates one set of embodiments of a method for creating a graphical program.

In one set of embodiments, a method for creating a graphical program may involve the following actions, as illustrated in FIG. 7A. The method may performed by a processor (or a set of processors).

At 705, the processor may configure a first diagram portion on a display. The first diagram portion may include a plurality of graphical elements that correspond to hardware components of a hardware device. The first diagram portion may also include one or more connections between the plurality of graphical elements, where the one or more connections represent flow of one or more signals between the hardware components corresponding to the plurality of graphical elements. The first diagram portion visually indicates a configuration of the hardware device. It is noted that the configuration may be state of configuration that is yet to be realized on the hardware device. Furthermore, it is noted that hardware components are not necessarily hardware components that physically exist at the time of configuring the first diagram. For example, in the case where at least part of the functionality of the first diagram is to be implemented on a programmable hardware element, one or more of the hardware components may be components that are to be created on the hardware device by appropriate configuration of the programmable hardware element.

At 710, the processor may configure a second diagram portion on the display, where the second diagram portion includes a data flow diagram portion. The data flow diagram portion includes one or more nodes.

At 715, the processor may connect the first diagram portion and the second diagram portion together to create the graphical program, where the graphical program is executable.

The one or more nodes may include a plurality of nodes. The second diagram portion may include one or more connections between the plurality of nodes. The one or more connections between the plurality of nodes represent data flow ordering dependencies between the plurality of nodes.

The graphical elements may have visual appearances that suggest or indicate the hardware components to which they correspond.

The process of configuring the first diagram portion may include receiving user input to the first diagram portion. The user input may specify a value of a parameter of the hardware device. The specified value may be checked (e.g., by querying the device driver of the hardware device) to determine if it is valid. The specified value may be displayed through an indicator in the first diagram portion in response to determining that the specified value is valid.

The user input may also specify a circuit resource. The specified circuit resource may be checked (e.g., by querying the device driver) to determine if it is realizable on the hardware device. The first diagram portion may be updated to include one or more graphical elements corresponding to the specified circuit resource in response to determining that the specified circuit resource is realizable on the hardware device.

The process of configuring the first diagram portion may include updating the first diagram portion in response to user input selecting a circuit resource of the hardware device, where the updated first diagram portion includes one or more graphical elements that represent the selected circuit resource.

The process of configuring the first diagram portion may include receiving user input to the first diagram portion. The method may further involve configuring the hardware device (or the device driver of the hardware device) in response the user input to the first diagram portion.

In some embodiments, the method may also involve executing the graphical program to invoke performance of a data transfer task, where the data transfer task is specified by the graphical program.

The action of connecting the first diagram portion and the second diagram portion together may involve either: (a) connecting an output of the first diagram portion to an input of the second diagram portion; or (b) connecting an input of the first diagram portion to an output of the second diagram portion.

The graphical program may be stored in a memory medium (e.g., in the memory of a computer system, or on a mass storage device such as a hard disk).

A second graphical program may be automatically generated based on the first diagram portion, where the second graphical data flow program is executable to configure the hardware device with the configuration indicated by the first diagram portion.

The first diagram portion may also include one or more graphical elements corresponding to hardware resources on a host computer.

In some embodiments, the graphical program is operable to be implemented on a programmable hardware element. For example, the graphical program may be compiled into a form suitable for programming a programmable hardware element.

In some embodiments, the method may also involve: configuring the hardware device based on the first diagram portion to produce a configured hardware device, where the configured hardware device is operable to perform a task specified by the graphical program; and creating an executable program based on the second diagram portion, where the executable program is executable by a processor to analyze data generated by the hardware device in response to performance of the task.

The process of configuring the hardware device may assume different forms depending on the kinds of hardware available on the hardware device. For example, ASICs, programmable hardware elements, embedded processors may each be configured in a different fashion. The present invention contemplates a wide variety of different types of hardware devices as targets for the configuration process.

Figure 7B:
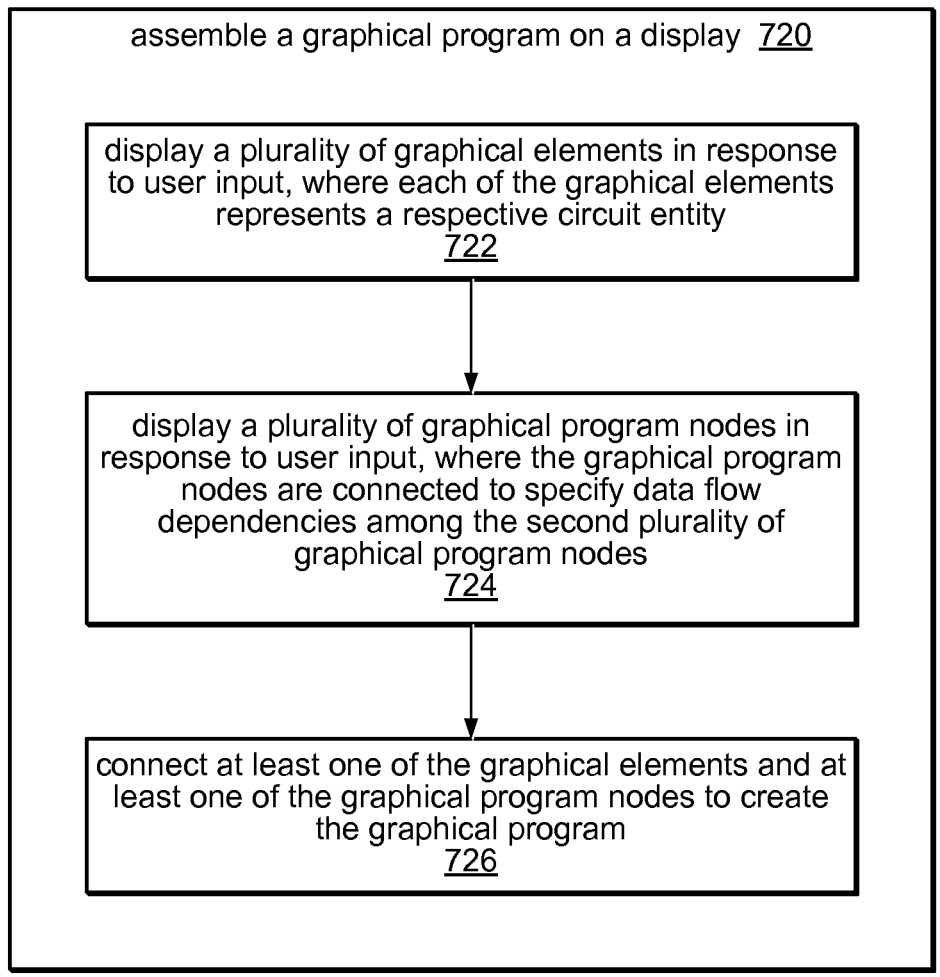
FIG. 7B illustrates another set of embodiments of a method for creating a graphical program.

In one set of embodiments, a method for creating a graphical program may involve assembling a graphical program on the display, e.g., as illustrated at 720 in FIG. 7B. The process of assembling the graphical program may include the following actions.

At 722, a plurality of graphical elements may be displayed in response to user input, where each of the graphical elements represents a respective circuit entity.

At 724, a plurality of graphical program nodes may be displayed in response to user input, where the graphical program nodes are connected to specify data flow dependencies among the second plurality of graphical program nodes.

At 726, at least one of the graphical elements and at least one of the graphical program nodes may be connected (e.g., by a wire) to create the graphical program.

The process of displaying the plurality of graphical elements may be performed by a single graphical program node.

The first diagram portion may be updated in response to user input selecting a value of a parameter of the hardware device, selecting a circuit resource, or deselecting a circuit resource, where said updating the first diagram is performed by the single graphical program node.

The graphical program may be stored in a memory medium (e.g., in the memory of a computer system, or on a storage device such as a hard disk).

Figure 7C:
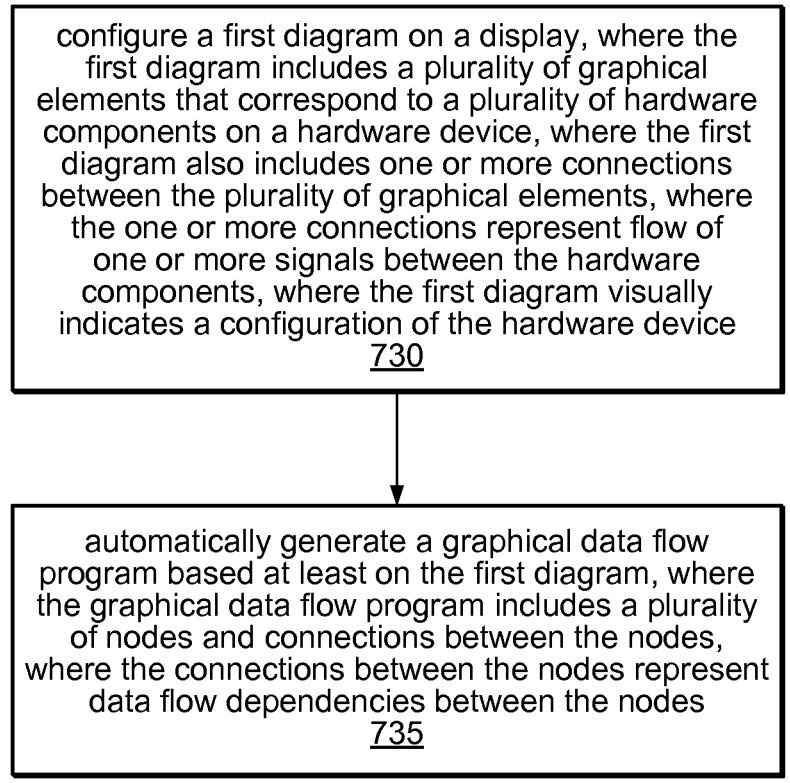
FIG. 7C illustrates one set of embodiments of a method for creating a graphical data flow program

In one set of embodiments, a method for creating a graphical data flow program may involve the following actions, as illustrated in FIG. 7C. The method may be performed by a processor (or a set of processors).

At 730, the processor may configure a first diagram on a display. The first diagram includes a plurality of graphical elements that correspond to a plurality of hardware components on a hardware device. The first diagram also includes one or more connections between the plurality of graphical elements. The one or more connections represent flow of one or more signals between the hardware components. The first diagram visually indicates a configuration of the hardware device.

At 735, the processor may automatically generate a graphical data flow program based at least on the first diagram. The graphical data flow program includes a plurality of nodes and connections between the nodes, where the connections between the nodes represent data flow dependencies between the nodes.

The graphical data flow program may be executed in order to configure the hardware device. The execution of the graphical data flow program configures the hardware device to implement the configuration indicated by the first diagram.

The graphical program may be stored in a memory medium (e.g., in the memory of a computer system, or on a mass storage device such as a hard disk).

The process of configuring the first diagram on the display may include updating the first diagram to add one or more additional graphical elements in response to user input to the first diagram selecting a circuit resource of the hardware device.

The process of configuring the first diagram on the display may include updating the first diagram to remove one or more of the graphical elements in response to user input to the first diagram deselecting a circuit resource of the hardware device.

The process of configuring the first diagram on the display may include updating the first diagram to replace one or more of the graphical elements with one or more additional graphical elements in response to a user selection.

The process of configuring a first diagram on a display may include receiving user input to the first diagram specifying a value of a parameter of the hardware device. The method may also involve: determining if the specified value is valid (e.g., by querying a device driver of the hardware device); and displaying the specified value in the first diagram in response to determining that the specified value is valid.

The process of configuring a first diagram on a display may include receiving user input to the first diagram specifying a circuit resource. The method may also involve: determining if the specified circuit resource is valid for the hardware device; and updating the first diagram to include one or more graphical elements corresponding to the specified circuit resource in response to determining that the specified circuit resource is valid.

The graphical data flow program is executable to configure the hardware device to implement an input and/or output task that is specified by the first diagram.

In another set of embodiments, a method for creating a graphical data flow program may involve the following actions, as illustrated in FIG. 7D. The method may be performed by a processor (or a set of processors).

At 740, the processor may configure a first diagram on a display in response to user input. The first diagram includes a plurality of graphical elements that represent a plurality of circuit resources, where the circuit resources include one or more circuit resources available on a hardware device. The first diagram also includes one or more connections between the plurality of graphical elements, where the one or more connections represent flow of one or more signals between the plurality of circuit resources. The first diagram visually indicates a configuration of the plurality of circuit resources.

At 745, the processor may automatically generate a graphical data flow program based at least on the first diagram, where the graphical data flow program includes a plurality of nodes and connections between the nodes, where the connections between the nodes represent data flow dependencies between the nodes.

The graphical data flow program may be executed in order to configure the hardware device.

The process of executing the graphical data flow program may include invoking a transfer of configuration information to the hardware device to configure the hardware device.

The graphical data flow program may be stored in a memory medium (e.g., in the memory of a computer system, or on a mass storage device such as a hard disk).

The process of configuring the first diagram on the display may include updating the first diagram to add one or more additional graphical elements in response to user input to the first diagram selecting an additional circuit resource of the hardware device.

The process of configuring the first diagram on the display may include updating the first diagram to remove one or more of the graphical elements in response to user input to the first diagram deselecting one of the circuit resources of the hardware device.

The process of configuring the first diagram on the display may include updating the first diagram to replace one or more of the graphical elements with one or more additional graphical elements in response to a user selection.

In some embodiments, the plurality of circuit resources may include one or more circuit resources available on a host computer.

In some embodiments, a computer-readable memory medium is configured to store program instructions. The program instructions are executable to implement the method X, where method X is any of the method embodiments described herein (or any combination of the method embodiments described herein).

A memory medium is a medium configured for the storage of information. Examples of memory media include various kinds of magnetic media (e.g., magnetic tape, magnetic disk, magnetic strips, and magnetic film); various kinds of optical media (e.g., CD-ROM); various kinds of semiconductor RAM and ROM; various media based on the storage of electrical charge and/or other physical quantities; etc.

In some embodiments, a computer system may be configured to include a processor and a memory medium. (See, e.g., the computer system of FIG. 4.) The memory medium may be configured to store program instructions. The processor may be configured to read and execute the program instructions. The program instructions may be executable to implement method X, where method X is any of the various method embodiments described herein. The computer system may be realized in any of various forms. For example, the computer system may be a personal computer (in any of its various forms), a computer on a card, a server computer, a client computer, etc.

The graphical program development environment (GDPE) may provide one or more palettes of nodes. The user may select instances of the nodes from the palettes and wire them together to form a graphical program. In one set of embodiments, the GDPE may provide an I/O palette, e.g., as illustrated in FIG. 7. The I/O palette may include a number of nodes that assist the user in setting up tasks such as analog input, analog output, digital input, digital output, or a combination thereof.

The I/O palette may include one or more nodes that are familiar to users of DAQmx, a software product of National Instruments. For example, nodes 71, 72 and 74-85 may behave the same as (or, similar to) the nodes of DAQmx having the same icons. For example, node 71 is a read VI used to invoke a read operation. Node 72 is a write VI, used to invoke a write operation. (VI is an acronym for "Virtual Instrument".)

Node 73 is new. Node 73 is designed to ease the process of setting up I/O tasks involving hardware devices and device drivers. Thus, node 73 may be referred to herein as the hardware configuration node. The hardware configuration node 73 displays a graphical schematic that reflects the current state of the configuration process. The graphical schematic changes as the user selects or deselects features. The schematic provides a visual reminder to the user of the features and configuration choices that are currently in effect. The schematic may include controls which allow the user to change the values of parameters (such as clock rates, buffer sizes). The schematic may also include indicators that indicate the current values of various parameters and the current state of various properties.

In some embodiments, the hardware configuration node 73 may be realized as an) (Node in LabVIEW. For more information on) (Nodes and their use in graphical programming, please refer to: U.S. patent application Ser. No. 10/094,198, filed on Mar. 8, 2002, entitled "Self-Determining Behavior Node for Use in Creating a Graphical Program", invented by Kodosky, Gabbert and Rogers.

In some embodiments, the hardware configuration node 73 may replace the following nodes from the top level palette of DAQmx: the Create Channel VI, the Timing VI, the Triggering VI, the property node for the Create Channel VI, the property node for the Timing VI, the property node for the Triggering VI, and the DAQ Assistant node.

Figure 8:
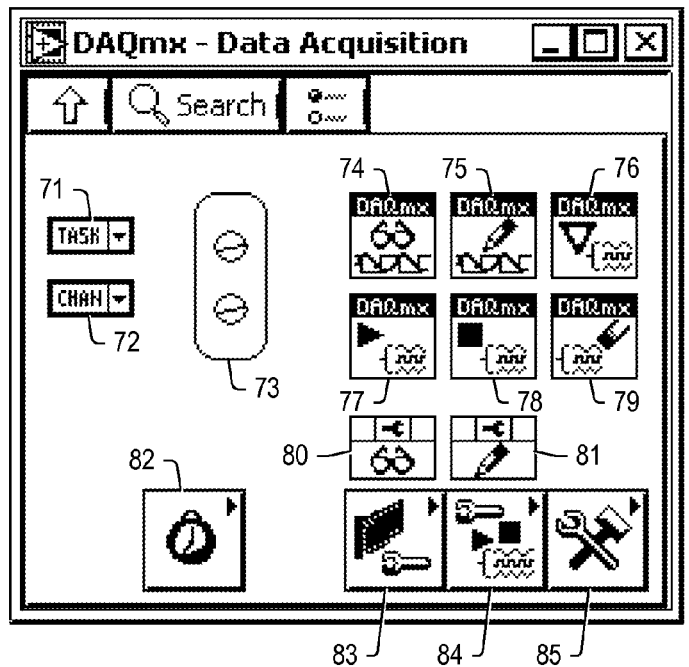
FIG. 8 illustrate one example of a palette providing a hardware configuration node.

In FIG. 8, the hardware configuration node 73 has the appearance of a plate bearing a pair of screw terminals. However, it is noted that the hardware configuration node 73 may have many different appearances depending upon its state. The state of the hardware configuration node is determined by configuration choices made by the user, as will become apparent in the following discussion. FIGS. 9-13, 15-19 and 21 illustrate the appearance of the hardware configuration node in various different states.

In some embodiments, the 'wires' of the graphical schematic displayed by the hardware configuration node 73 cannot be stretched nor can the icons of the graphical schematic be rearranged. In these embodiments, the icons are not dropped from a palette. Rather they are exposed/hidden or added/removed by user selection, e.g., by right click menu options provided by the hardware configuration node 73.

Figure 9:
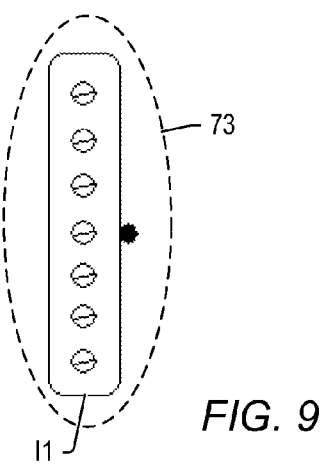
FIG. 9 illustrates one possible initial appearance of the hardware configuration node after dropping the hardware configuration node on the block diagram.

FIG. 9 illustrates an icon I1 that represents the hardware configuration node 73 as it may appear after being dropped on a block diagram. This appearance is meant to suggest an I/O connector on a hardware device (e.g., a data acquisition device).

The user may select a hardware device from a set of available hardware devices and bind (i.e., associate) the hardware configuration node 73 with the selected hardware device. In some embodiments, the GPDE may provide a configuration assistant GUI to facilitate such configuration choices with respect to the hardware configuration node 73. The user may call up the configuration assistant, e.g., by right clicking and selecting CONFIGURE (or double clicking) on the icon I1. Alternatively, the configuration assistant may be invoked automatically upon dropping the hardware configuration node on the block diagram.

The configuration assistant may prompt the user for:
the type of I/O task or operation to be performed (e.g., one of analog input, analog output, digital input, digital output, etc);
the selection of a hardware device (from a set of available hardware devices) to be associated with the hardware configuration node;
the selection of one or more physical channels of the hardware device; and
the type of measurement to be performed (e.g., voltage, current, temperature, strain, duration, etc), and perhaps also the maximum and minimum expected values, for each physical channel.

The user may connect the hardware configuration node 73 to a Read VI (e.g., an instance of Read VI 74) with a wire, thereby forming a graphical program. The graphical program may be executed in order to configure the selected hardware device, i.e., to prepare the selected hardware device for performing the selected I/O task on the selected physical channel(s).

Figure 10:
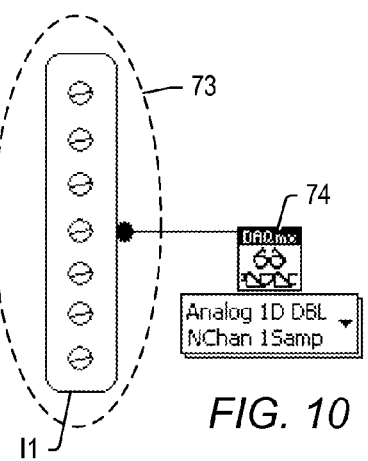
FIG. 10 illustrates a simple graphical program including the hardware configuration node connected to a read node.

Since the user has not yet specified any timing or triggering attributes for the hardware configuration node 73, the I/O task defined by FIG. 10 may be performed as an On Demand task. An "On Demand" task is a task that is performed in response to a command from host software (e.g., software executing on the host computer 26.)

Figure 11:
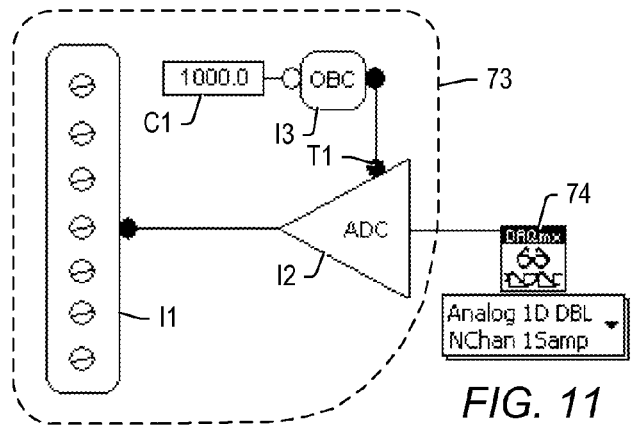
FIG. 11 illustrates one possible appearance of the hardware configuration node in the state where an analog input task has been elected by the user.

If the user desires to specify timing attributes for the I/O task, the user may select a SHOW TIMING feature, e.g., by right clicking on the icon I1 and making the corresponding selection from a menu. Selection of the SHOW TIMING feature may add an icon I2 of an analog-to-digital converter (ADC), an icon I3 representing an OnBoard Clock (OBC), and a rate control C1, as shown in FIG. 11.

The ADC icon I2 is connected to the screw terminal icon I1, thus suggesting that the A/D converter of the selected hardware device will receive a signal from the selected analog input channel. The OBC icon I3 connects to a sample clock terminal T1 of the ACD icon I2, thus suggesting that an OnBoard clock (of the selected hardware device) will be used as a sample clock to control sample times of the A/D converter. The OBC icon I3 is connected to a rate control C1. The user may select a rate value (from a set of rates that are available on the hardware device) via the rate control C1. In the state of the hardware configuration node 73 shown in FIG. 11, the A/D converter will generate samples at 1000 samples per second. However, the Read VI 74 may read only one of these samples (unless it is embedded in a loop structure and thereby made to execute repeatedly). Thus, the task illustrated in FIG. 11 may be referred to as a "hardware-timed single-point acquisition at 1000 samples/second". The hardware configuration node 73 may offer other configuration options for the ADC, e.g., options such as dithering, compression, and self calibration (e.g., self-calibrate now or self-calibrate upon each execution of the graphical program).

If the user wishes to use an external clock (i.e., a clock signal provided from outside the selected hardware device) as the sample clock, the source clock terminal T1 of the ADC icon may be rebound to a different pin of the hardware device (e.g., by double-clicking on the OBC icon I3 and selecting a different pin, other than the onboard clock, from a list of pins).

Figure 12:
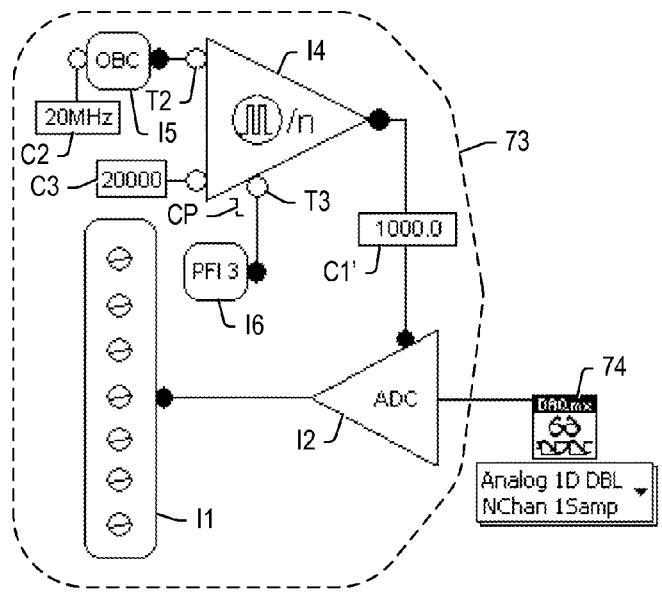
FIG. 12 illustrates an example where the user has elected to expose some of the internals of the sample clock circuitry.
Figure 16:
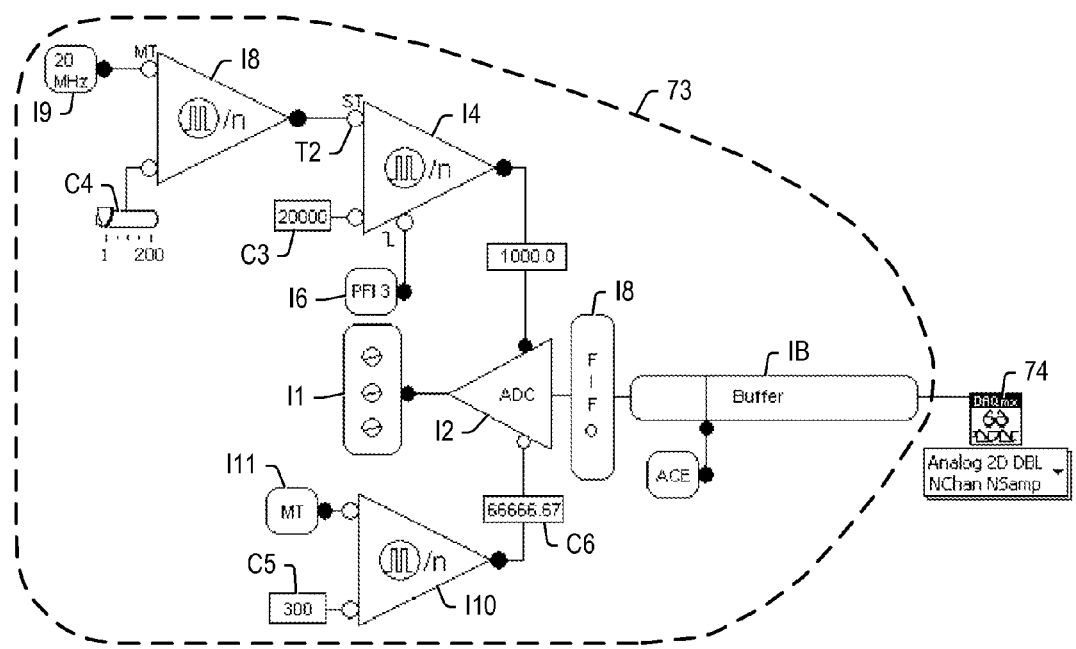
FIG. 16 illustrates one possible appearance of the hardware configuration node after the user has elected to expose the A/D conversion clock circuitry and to expose internals of a clock source.

OnBoard Clock icons may be expanded to show the configuration details of the particular clocks they represent. For example, by right clicking on the OBC icon I3 and selecting EXPAND (or by double clicking on the OBC icon I3), the user may cause the hardware configuration node 73 to replace the OBC icon I3 with a graphic including a frequency divider icon I4, an OnBoard clock icon I5, a source frequency control C2 and a divisor control C3, as shown in FIG. 12. The OBC icon I5 is connected to the source clock terminal T2 of the frequency divider icon I4, implying that a frequency divider circuit on the selected hardware device will divide a source clock available on the selected hardware device in order to derive the 1000 Hz sample clock feeding the ADC. The source frequency control C2 allows the user to select the frequency of the source clock from a set of allowed values. (A hardware device or a family of hardware devices may impose a limitation on the available frequencies for the source clock. For example, the E Series hardware devices manufactured by National Instruments limit the choice of the source frequency to 20 MHz or 100 KHz). The OBC icon I5 may also be expanded to show the master timebase clock (e.g., as shown in FIG. 16).

The divisor control C3 allows the user to specify the integer divisor to be used to divide down the source clock. The divisor control C3 may initially display a value consistent with a previously selected sample clock frequency and the default source clock frequency. For example, based on a default source clock frequency of 20 MHz and a previously selected sample clock frequency of 1000 Hz, the divider value may be initially set to 20,000 (since 20 MHz/20000=1000 Hz).

A start trigger terminal T3 may be added to the frequency divider icon I4 by user selection, e.g., via a right click menu option called ADD START TRIGGER. The start trigger terminal T3 may be initially shown as connected to the default pin for the start trigger feature. FIG. 12 shows the start trigger terminal T3 bound to the pin PFI 3. Thus, the sample clock will be disabled until the assertion of an active edge of the signal at pin PFI 3. The active edge is selected by the user via polarity control CP. By clicking on the polarity control CP the user may toggle between selection of the rising edge and selection of the falling edge as the active edge.

In one alternative embodiment, the Start trigger, Pause trigger and Stop trigger may be attached to the ADC icon I2 instead of the sample clock icon. (Note: Any icon that is currently connected to the sample clock terminal T1 of the ADC icon I2 is referred to as the sample clock icon. In FIG. 11, the OBC icon I3 is the sample clock icon. In FIG. 12, the frequency divider icon I4 is the sample clock icon.) Thus, in this alternative embodiment, the sample clock icon does not need to be expanded in order to add a Start trigger. However, in the illustrated embodiment, these triggers are associated with the sample clock icon.

The user may change the task to a timed and buffered (waveform capture) task, e.g., by right clicking on the ADC icon I2 and selecting the ADD BUFFER option. Selection of the ADD BUFFER option causes the hardware configuration node 73 to add a buffer icon IB in the graphical schematic.

The buffer icon IB may represent a buffer in the main memory of the host computer (e.g., in the main memory 166 of computer system 26).

Figure 13:
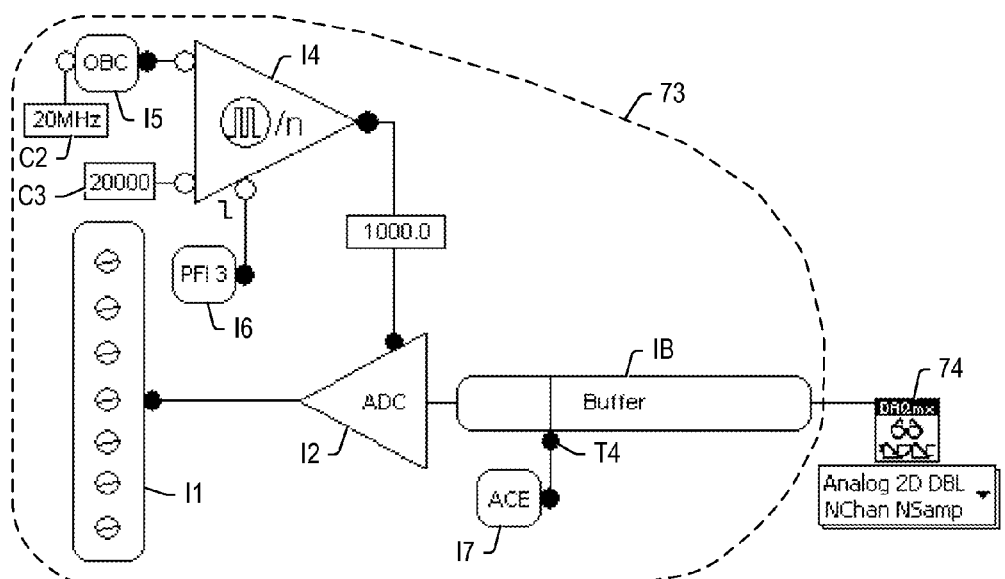
FIG. 13 illustrates one possible appearance of the hardware configuration node after the user has elected to add a buffer.

The buffer may have configuration options such as size and finite/continuous. Additionally, the buffer may have an ADD REFERENCE TRIGGER option. Selecting this option adds the reference trigger terminal T4 to the buffer icon IB. The number of pretrigger points may be specified by clicking and dragging the reference trigger terminal T4 left or right along the buffer icon IB. The reference trigger terminal T4 may be shown initially connected to a default pin, such as PFI 0. In FIG. 13, the reference trigger terminal T4 has been rebound to the Analog Comparison Event icon I7 (which represents the output of analog trigger circuitry on the hardware device). The task is now a waveform capture with a digital start trigger and an analog reference trigger.

To specify configuration information for the analog comparison (to be performed by the analog trigger circuitry), the user may double click on the ACE terminal 17. Doing so invokes a dialog, e.g., the dialog shown in FIG. 14. This dialog allows the user to completely specify the configuration of the analog trigger circuitry. For example, the dialog may allow the user to specify an analog trigger source, a trigger type (e.g., analog rising edge or analog falling edge), a trigger level and a hysteresis value.

In an alternative embodiment, the action of double clicking on the ACE terminal icon I7 may invoke in-place expansion instead of invocation of a dialog. In-place expansion means that the ACE terminal icon I7 is replaced by a more detailed graphic include controls which allow the user to specify configuration information for the analog trigger circuitry.

Figure 15:
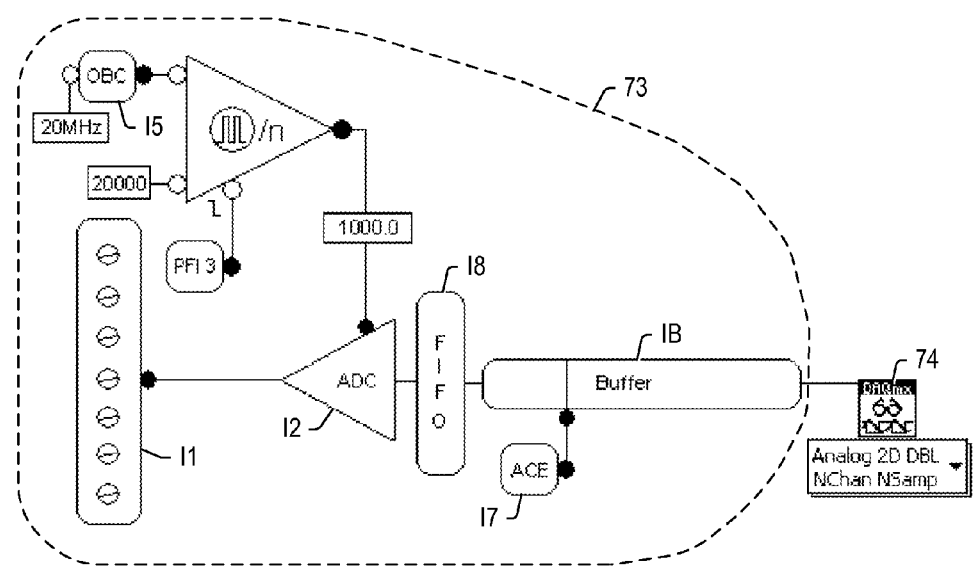
FIG. 15 illustrates one possible appearance of the hardware configuration node after the user has elected to use a FIFO to capture data from the A/D converter.

If the user wishes to have samples captured into a FIFO of the hardware device, the user may select SHOW FIFO, e.g., by right clicking on the ADC icon I2 and selecting the corresponding feature from a menu. Selection of the SHOW FIFO feature causes the hardware configuration node 73 to inject a FIFO icon I8 between the ADC icon I2 and the buffer icon IB in the displayed graphic, as shown in FIG. 15. The user may configure data transfer properties of the FIFO by clicking on the FIFO icon I8.

Selecting expansion of the OBC icon I5 and selecting the AI CONVERT CLOCK feature of the ADC icon I2 may cause the hardware configuration node 73 to display the graphic shown in FIG. 16. The OBC icon I5 is replaced by a frequency divider icon I8, a 20 MHz clock icon I9 and a divisor control C4. The AI CONVERT CLOCK feature is illustrated by a frequency divider icon I10, a master timebase (MT) icon I11, a divisor control C5, and a conversion rate control C6.

Figure 17:
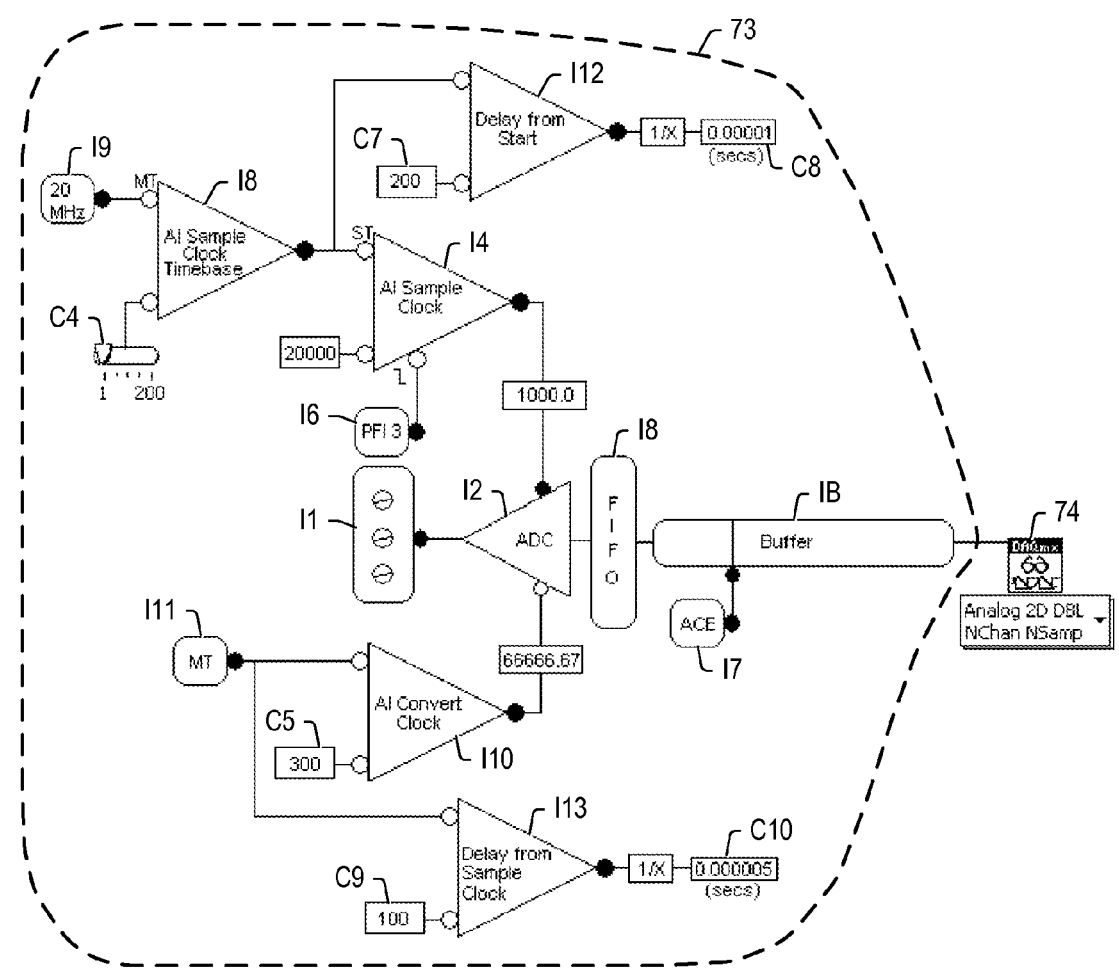
FIG. 17 illustrates one possible appearance of the hardware configuration node after the user has elected the "delay from start" feature and the "delay from sample clock" feature.

Right clicking on the sample clock icon I4 and selecting SHOW DELAY induces display of a delay-from-start icon I12, a delay-from-start control C7, and a seconds control C8, as shown in FIG. 17. Right clicking on the convert clock icon I10 and selecting SHOW DELAY induces display of a delay-from-sample-clock icon I13, a control C9 and a seconds control C10, as shown in FIG. 17.

Figure 18:
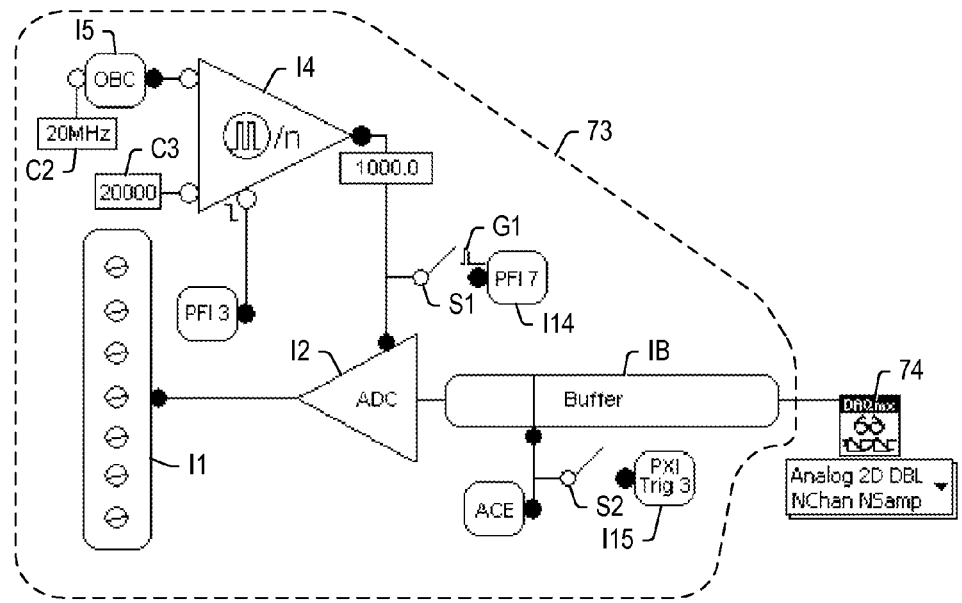
FIG. 18 illustrates one possible appearance of the hardware configuration node where one or more signals of the circuit-like schematic are made available for export to external pins of the hardware device via corresponding user-controllable switches.

FIG. 18 offers an example of the export of signals to external pins of the selected hardware device. In particular, the hardware configuration node 73 is shown in a state where sample clock signal may be exported to a first destination terminal (pin PFI 7 in the case illustrated) and the reference trigger signal may be exported to a second destination terminal (pin PXI Trig 3 in the case illustrated). By clicking on the switch icon 51, the user may effect the export of the sample clock signal to the pin PFI 7. The hardware device node 73 may redraw the graphical schematic with the switch 51 in the closed state in response to this user input. By clicking on the switch icon S2, the user may effect the export of the reference trigger signal to the pin PXI Trig 3. The glyph G1 by the pin icon I14 offers the user the choice of exporting the sample clock signal in pulse mode or level mode. The pulse mode choice is shown. The export switches 51 and S2 and their destination terminals may be revealed with a right click option, or displayed by default when their corresponding sources are displayed.

In some embodiments, when the user attempts to change a parameter, the hardware device node 73 may perform a check to determine whether or not the new value is valid. For example, the hardware device may coerce the parameter to be certain value or limit the parameter to a set of available values. If valid, the new value may be accepted. Any parameters that depend on the changed parameter may be updated and the updates displayed in their respective indicators on the graphical schematic of the hardware configuration node 73. If invalid, the change may be rejected and the parameter may be restored to its previous value.

Furthermore, when the user selects a certain task to be performed by the hardware device, the hardware device node 73 may verify that the task is valid. For example, certain hardware device may not be capable of performing the selected task. If the task is valid, the selection may be accepted. If the task is invalid, the task may be rejected and an indication of the rejection may be presented to the user. The verification of a selected task may involve interrogating one or more device drivers that are informed on the capabilities of the hardware device.

Figure 19:
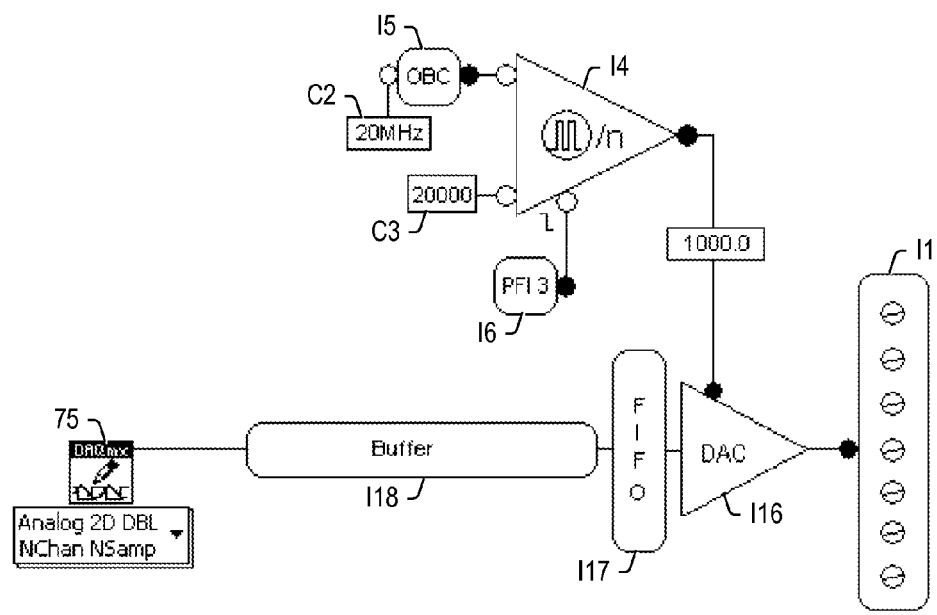
FIG. 19 illustrates one possible appearance of the hardware configuration node in the case of an analog output task.

FIG. 19 illustrates an analog output example similar to the analog input example of FIG. 15. The signal from pin PFI 3 acts as a start trigger. The reference trigger has been removed from the displayed graphic since it does not apply to analog output. DAC is an acronym for "Digital-to-Analog Converter".

In one embodiment, the user may select a GENERATE CODE menu option to induce the GPDE to generate program code based on the block diagram and on any additional information the user may have specified, e.g., through one or more GUIs. The block diagram includes the graphical schematic generated by the hardware configuration node 73. The program code may be graphical program code such as DAQmx code.

Referring once again to FIG. 12, note that a hardware timed single point (non-buffered) acquisition of one or more channels is specified by the block diagram. The sample rate is 1000 samples per second. A start trigger is configured such that the acquisition does not begin until an active edge occurs on the signal present at the PFI 3 terminal.

Figure 20:
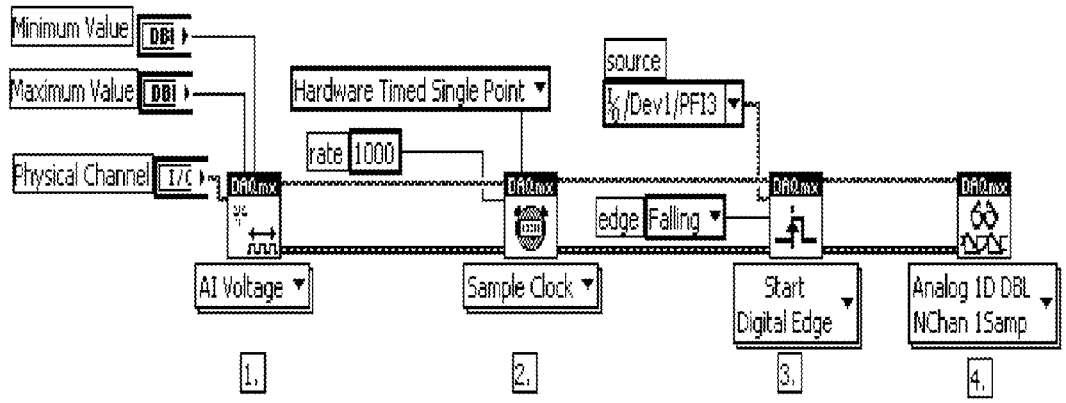
FIG. 20 illustrates graphical program code configured to realize the functionality specified by the block diagram of FIG. 12.

FIG. 20 shows graphical program code, configured to realize the functionality specified by the block diagram of FIG. 12, written in LabVIEW 7.1 using the DAQmx library of VIs. The GPDE may generate the graphical program code of FIG. 20 from the block diagram of FIG. 12.

Figure 14:
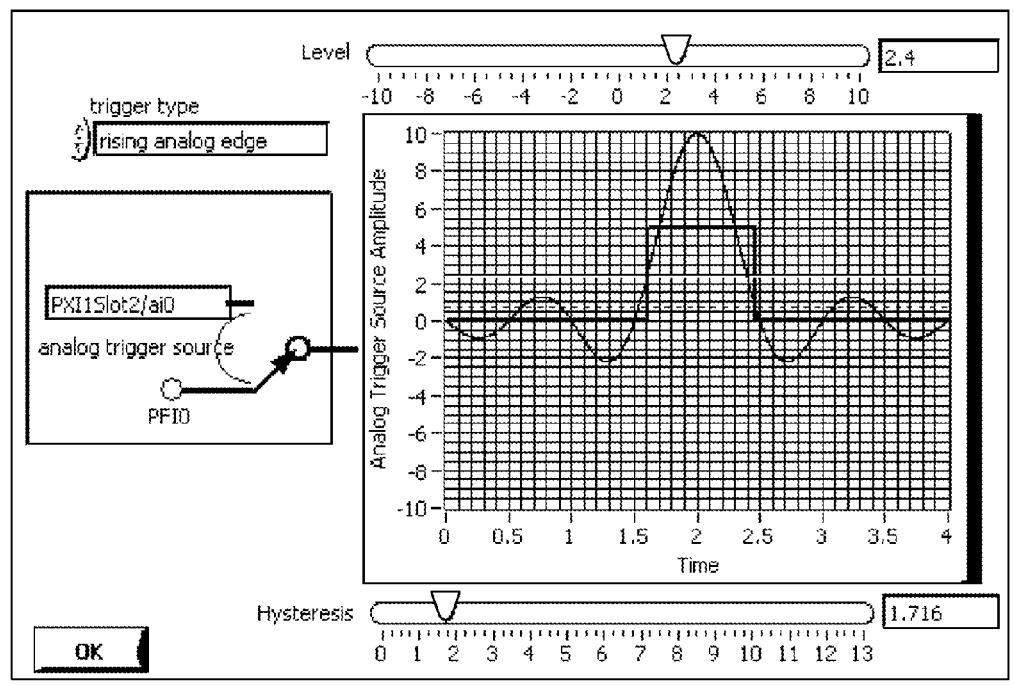
FIG. 14 illustrates one embodiment of a dialog which allows the user to specify configuration information for analog triggering circuitry.
Figure 21:
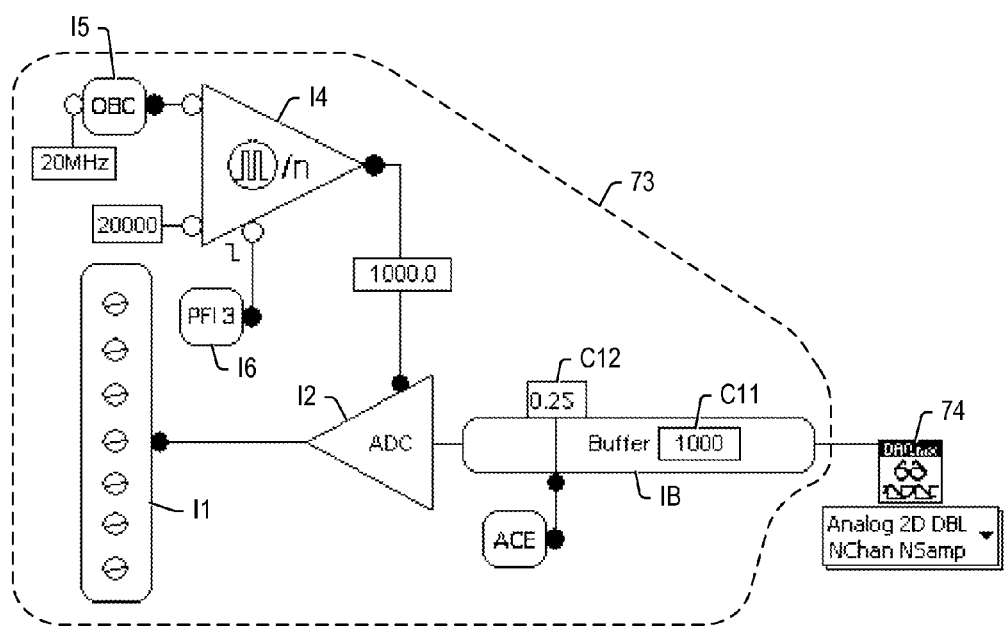
FIG. 21 illustrates one possible appearance of the hardware configuration node where size and "pretrigger fraction" controls are exposed on the buffer.
Figure 22:
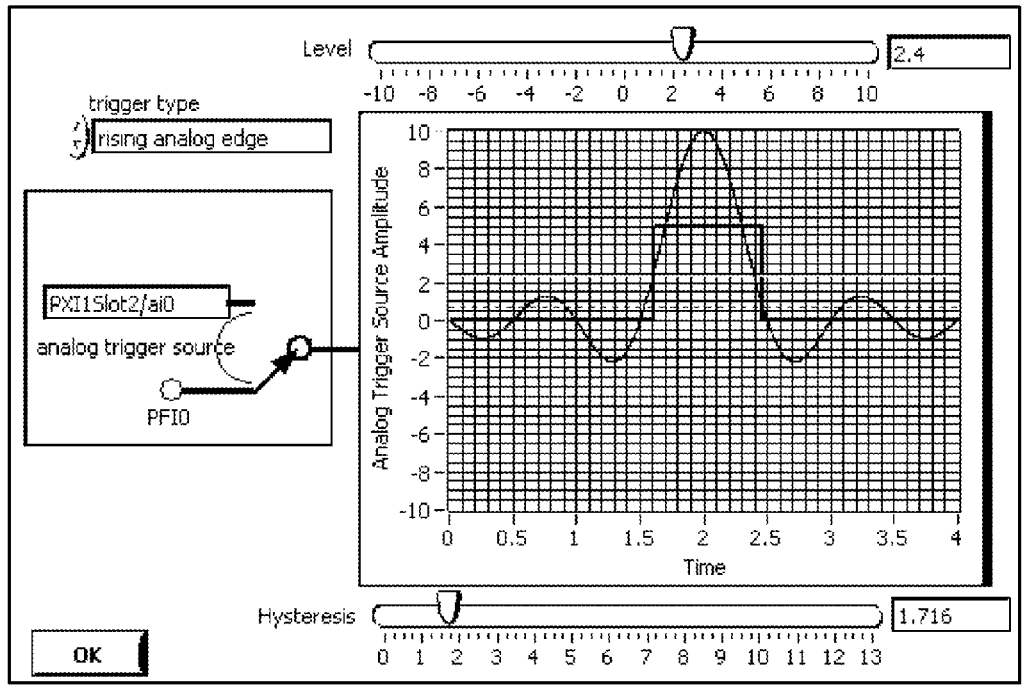
FIG. 22 illustrates one embodiment of a dialog which allows the user to specify configuration information for analog triggering circuitry.

FIGS. 21 and 22 illustrate an example similar to the example illustrated in FIGS. 13 and 14 respectively. In FIG. 21, the buffer icon IB has two additional elements: size control C11 and pretrigger fraction control C12. The user may determine the size of the buffer (in terms of samples) by providing input to the size control C11. The user may determine the pretrigger fraction by providing input to the control C12. The graphical schematic of FIG. 21 defines a pretriggered acquisition, with a buffer size of 1000 samples and a pretrigger fraction of 0.25 (i.e., 25% of the buffer or 250 samples). The sample rate is 1000 samples per second. A start trigger is configured such that the acquisition does not begin until an active edge occurs on the signal present at the PFI 3 terminal. A reference trigger is configured to use the ACE terminal as its source.

The trigger condition for the reference trigger may be configured using a dialog such as the one shown in FIG. 22. As shown, the trigger condition is configured to occur when the analog signal at the PFI 0 terminal rises above 2.4 Volts after having previously been below 2.4−1.716=0.684 Volts.

The amount of pretrigger data is determined by the relative position (along the buffer icon IB) of the complex defined by the reference trigger terminal T4, the vertical line rising up from the reference trigger terminal and the control C12.

Figure 23:
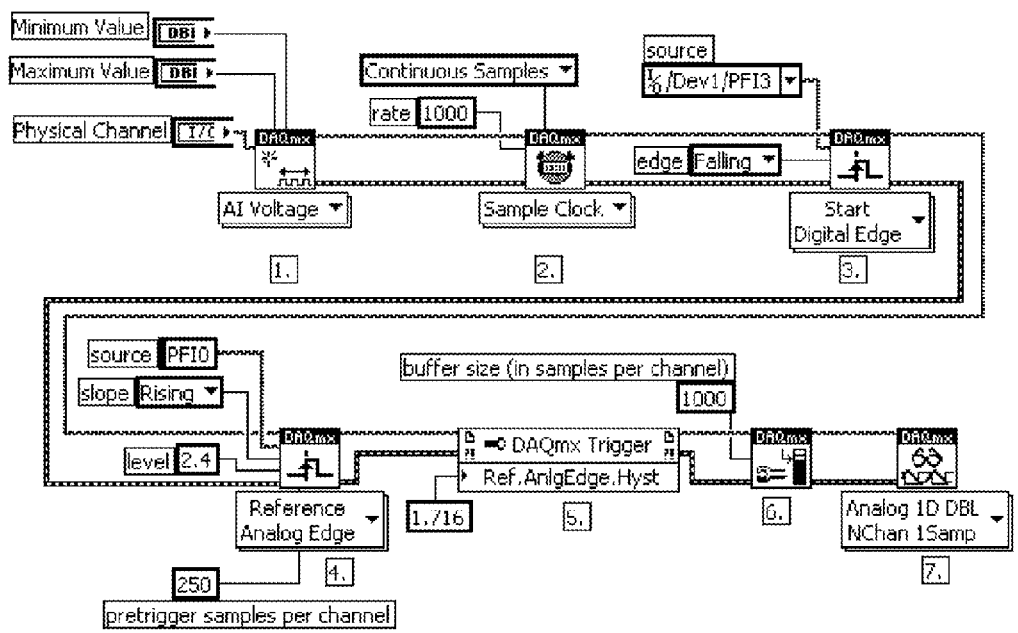
FIG. 23 illustrates graphical program code configured to realize the task specified by the block diagram of FIG. 21 and by the information specified in the dialog of FIG. 22.

FIG. 23 shows graphical program code, configured to realize the task specified by the block diagram of FIG. 21 and by the information specified in the dialog of FIG. 22, written in LabVIEW 7.1 using the DAQmx library of VIs.

CONCLUSION

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer accessible memory medium comprising program instructions for configuring a first hardware device, wherein the program instructions are executable to:
    display a first diagram including a hardware configuration node in response to user input selecting the hardware configuration node;
    bind the hardware configuration node with the first hardware device in response to user input selecting the first hardware device;
    receive user input selecting a hardware resource from a set of available hardware resources of the first hardware device;
    update the hardware configuration node to include a pictorial representation of the selected hardware resource, wherein the pictorial representation of the selected hardware resource is included in the hardware configuration node and represents at least a partial circuit diagram of the first hardware device;
    receive user input specifying configuration for the selected hardware resource; and
    connect the hardware configuration node with a dataflow node in the first diagram in response to user input.

2. The non-transitory computer accessible memory medium of claim 1, wherein said receiving user input selecting a hardware resource, said updating the hardware configuration node to include a pictorial representation of the selected hardware resource, and said receiving user input specifying configuration for the selected hardware resource are performed a plurality of times for a corresponding plurality of hardware resources of the first hardware device.

3. The non-transitory computer accessible memory medium of claim 2, wherein the program instructions are further executable to update the first diagram to visually specify the configuration for the first hardware device based on performing said receiving user input selecting a hardware resource, said updating the hardware configuration node to include a pictorial representation of the selected hardware resource, and said receiving user input specifying configuration for the selected hardware resource a plurality of times.

4. The non-transitory computer accessible memory medium of claim 1, wherein the program instructions are further executable to perform said receiving user input selecting a hardware resource, said updating the hardware configuration node to include a pictorial representation of the selected hardware resource, and said receiving user input specifying configuration for the selected hardware resource a plurality of times, thereby specifying a configuration for the first hardware device.

5. The non-transitory computer accessible memory medium of claim 1, wherein the program instructions are further executable to update the first diagram to visually specify the configuration for the selected hardware resource based on the user input specifying the configuration for the selected hardware resource.

6. The non-transitory computer accessible memory medium of claim 1, wherein the program instructions are further executable to generate a graphical program based on the first diagram, wherein the graphical program is executable to configure the first hardware device based on the configuration.

7. The non-transitory computer accessible memory medium of claim 1, wherein the program instructions are further executable to generate a graphical program based on the first diagram, wherein the graphical program is executable to configure the first selected hardware resource according to the configuration.

8. The non-transitory computer accessible memory medium of claim 1, wherein the selected hardware resource comprises a circuit resource of the first hardware device.

9. The non-transitory computer accessible memory medium of claim 1, wherein the first hardware device comprises a plurality of physical channels, and wherein the program instructions are further executable to:
    bind the first icon with one or more physical channels of the plurality of physical channels of the first hardware device in response to user input selecting the one or more physical channels.

10. The non-transitory computer accessible memory medium of claim 9, wherein the program instructions are further executable to:
    bind the hardware resource with a first channel of the one or more physical channels.

11. The non-transitory computer accessible memory medium of claim 1, wherein the selected hardware resource comprises a physical channel of the first hardware device.

12. The non-transitory computer accessible memory medium of claim 1, wherein the user input selecting a hardware resource comprises user input selecting all of the available hardware resources of the first hardware device, wherein the program instructions are further executable to:
    update the hardware configuration node to include a pictorial representation of all of the available hardware resources; and
    receive user input specifying configuration for each hardware resource of the available hardware resources.

13. A method for configuring a first hardware device, comprising:
    displaying a first diagram including a hardware configuration node in response to user input selecting the hardware configuration node;
    binding the hardware configuration node with the first hardware device in response to user input selecting the first hardware device;
    receiving user input selecting a hardware resource from a set of available hardware resources of the first hardware device;

updating the hardware configuration node to include a pictorial representation of the selected hardware resource, wherein the pictorial representation of the selected hardware resource is included in the hardware configuration node and represents at least a partial circuit diagram of the first hardware device;

receiving user input specifying configuration for the selected hardware resource; and connect the hardware configuration node with a dataflow node in the first diagram in response to user input.

14. The method of claim 13, further comprising:

performing said receiving user input selecting a hardware resource, said updating the hardware configuration node to include a pictorial representation of the selected hardware resource, and said receiving user input specifying configuration for the selected hardware resource a plurality of times for a plurality of hardware resources of the first hardware device.

15. The method of claim 14, further comprising: updating the first diagram to visually specify the configuration for the first hardware device based on said performing said receiving user input selecting a hardware resource, said updating the hardware configuration node to include a pictorial representation of the selected hardware resource, and said receiving user input specifying configuration for the selected hardware resource a plurality of times.

16. The method of claim 13, further comprising:

performing said receiving user input selecting a hardware resource, said updating the hardware configuration node to include a pictorial representation of the selected hardware resource, and said receiving user input specifying configuration for the selected hardware resource a plurality of times, thereby specifying a configuration for the first hardware device.

17. The method of claim 13, further comprising:

updating the first diagram to visually specify the configuration for the selected hardware resource based on the user input specifying the configuration for the selected hardware resource.

18. The method of claim 13, further comprising:

generating a graphical program based on the first diagram, wherein the graphical program is executable to configure the first hardware device based on the configuration.

19. The method of claim 13, further comprising:

generating a graphical program based on the first diagram, wherein the graphical program is executable to configure the first selected hardware resource according to the configuration.

20. The method of claim 13, wherein the selected hardware resource comprises a circuit resource of the first hardware device.

21. The method of claim 13, wherein the first hardware device comprises a plurality of physical channels, the method further comprising:

binding the hardware configuration node with one or more physical channels of the plurality of physical channels of the first hardware device in response to user input selecting the one or more physical channels.

22. The method of claim 21, further comprising:

binding the hardware resource with a first channel of the one or more physical channels.

23. The method of claim 13, wherein the selected hardware resource comprises a physical channel of the first hardware device.

24. The method of claim 13, wherein said receiving user input selecting a hardware resource comprises receiving user input selecting all of the available hardware resources of the first hardware device, the method further comprising:

updating the hardware configuration node to include a pictorial representation of all of the available hardware resources; and receiving user input specifying configuration for each hardware resource of the available hardware resources.

* * * * *